US010551094B2

(12) United States Patent
Moghaddam et al.

(10) Patent No.: US 10,551,094 B2
(45) Date of Patent: Feb. 4, 2020

(54) 3D MICROSTRUCTURES FOR RAPID ABSORPTION/DESORPTION IN MECHANICALLY CONSTRAINED LIQUID ABSORBENTS

(71) Applicant: University of Florida Research Foundation, Incorporated, Gainesville, FL (US)

(72) Inventors: Saeed Moghaddam, Gainesville, FL (US); Devesh Chugh, Gainesville, FL (US); Sajjad Bigham, Hancock, MI (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 86 days.

(21) Appl. No.: 15/196,383

(22) Filed: Jun. 29, 2016

(65) Prior Publication Data
US 2016/0305693 A1    Oct. 20, 2016

Related U.S. Application Data

(63) Continuation-in-part of application No. PCT/US2014/072664, filed on Dec. 30, 2014.
(Continued)

(51) Int. Cl.
*F25B 17/02* (2006.01)
*F25B 15/06* (2006.01)
(Continued)

(52) U.S. Cl.
CPC .............. *F25B 17/02* (2013.01); *F25B 15/06* (2013.01); *F25B 35/02* (2013.01); *F25B 37/00* (2013.01)

(58) Field of Classification Search
CPC .......... F25B 17/02; F25B 37/00; F25B 35/02; F25B 15/06
See application file for complete search history.

(56) References Cited

U.S. PATENT DOCUMENTS 6,126,723 A * 10/2000 Drost ...................... B01B 1/005
96/108
2003/0064507 A1* 4/2003 Gallagher ................ B01F 9/10
435/287.2
(Continued)

FOREIGN PATENT DOCUMENTS

WO    WO 2013-063210        5/2013
WO    WO 2013063210 A1 *    5/2013    .............. F25B 15/00

OTHER PUBLICATIONS

Stroock, A. D. et al., "Chaotic mixer for microchannels", Jan. 25, 2002, Sciencemag, vol. 295, 647-651.*
Bigham, S. et al., "Moving beyond the limits of mass transport in liquid absorbent microfilms through the implementation of surface-induced vortices," Energy, 2014, pp. 621-630, vol. 65.
(Continued)

*Primary Examiner* — Frantz F Jules
*Assistant Examiner* — Lionel Nouketcha
(74) *Attorney, Agent, or Firm* — Alston & Bird LLP

(57) ABSTRACT

An absorber or desorber contains one or more microchannels that have a 3-D structured heat-exchanging surface and a membrane on the microchannel situated distal to the 3-D structured heat-exchanging surface, where the membrane is permeable to a solvent of a solution employed in the absorber or desorber. The 3-D structured surface promotes mixing of hot and cold solution between the 3-D structured heat-exchanging surface and a vapor-exchanging surface proximal to the membrane. The mixing reduces the differences in concentration and temperature of the bulk solution and the solution at the vapor-exchanging surface to enhance the efficiency and rate of absorption or desorption of the solvent.

17 Claims, 24 Drawing Sheets

Related U.S. Application Data

(60) Provisional application No. 61/922,460, filed on Dec. 31, 2013.

(51) Int. Cl.
*F25B 37/00* (2006.01)
*F25B 35/02* (2006.01)

(56) References Cited

U.S. PATENT DOCUMENTS

| | | | | |
|---|---|---|---|---|
| 2004/0104012 | A1* | 6/2004 | Zhou | H01L 23/427 165/104.26 |
| 2004/0262223 | A1 | 12/2004 | Strook et al. | |
| 2005/0286227 | A1 | 12/2005 | Erturk et al. | |
| 2007/0017633 | A1* | 1/2007 | Tonkovich | B01F 5/0611 156/300 |
| 2007/0263485 | A1 | 11/2007 | Yang et al. | |
| 2011/0285038 | A1* | 11/2011 | Lin | A61M 1/1698 261/101 |
| 2013/0133346 | A1* | 5/2013 | Garimella | F25B 15/02 62/101 |
| 2013/0312440 | A1* | 11/2013 | Tang | F25B 15/06 62/109 |

OTHER PUBLICATIONS

Bigham, S. et al., "Direct molecular diffusion and micro-mixing for rapid dewatering of LiBr solution," *Applied Thermal Engineering*, 2014, pp. 371-375, vol. 64.

Chugh, D., et al. A Novel Absorption Cycle for Combined Water Heating, Dehumidification, and Evaporative Cooling, *International Sorption Heat Pump Conference*, Mar. 31-Apr. 3, 2014, Washington, D.C., USA, pp. 1-10.

Nasr Isfahani, R. et al., "Absorption characteristics of lithium bromide (LiBr) solution contrained by superhydrophobic nanofibrus structures," *International Journal of Heat and Mass Transfer*, 2013, pp. 82-90, vol. 63.

Nasr Isfahani, R. et al., "Nanofibrous membrane-based absorption refrigeration system," *International Journal of Refrigeration*, 2013, pp. 2297-2307, vol. 36.

Nasr Isfahani, R. et al., "Impact of micromixing on performance of a membrane-based absorber," *Energy*, 2015, pp. 997-1004, vol. 90.

Stroock, A.D. et al., "Chaotic Mixer for Microchannels," *Science*, Jan. 25, 2002, pp. 647-651, vol. 295.

Yu, D. et al., "Parametric study of water vapor absorption into a constrained thin film of lithium bromide solution," *International Journal of Heat and Mass Transfer*, 2012, pp. 5687-5695, vol. 55.

* cited by examiner

3D MICROSTRUCTURES FOR RAPID ABSORPTION/DESORPTION IN MECHANICALLY CONSTRAINED LIQUID ABSORBENTS

CROSS-REFERENCE TO RELATED APPLICATIONS

This application is a continuation-in-part of International Application No. PCT/US2014/072664, filed Dec. 30, 2014, which claims the benefit of U.S. Provisional Application Ser. No. 61/922,460, filed Dec. 31, 2013, the disclosures of which are hereby incorporated by reference in their entireties, including any figures, tables, or drawings.

This invention was made with government support under DE-AR0000133 awarded by the Department of Energy. The government has certain rights in the invention.

BACKGROUND OF INVENTION

Absorption and/or desorption are processes that are exploited in many processes. These processes involve the gain or loss of a component to a solution. Many factors affect these processes, including solution compositions, heat exchange, surface area, temperatures, and other factors. Many absorption and desorption processes involve aqueous solutions.

Absorption of species into a liquid is widely used in many technologies, including: absorption heat pumps; liquid desiccant-based dehumidification; purification of the natural gas streams involving separation of $CO_2$ and $H_2S$; removal of $CO_2$ from flue gas; and bioreactors in which gaseous products are absorbed into a liquid phase for processing/conversion by microorganisms. Absorption is limited by the rate of absorbate diffusion into the absorbent. In cases involving an absorbate with a high heat of phase change, such as water vapor absorption into a lithium bromide (LiBr) solution in an absorption heat pump or a dehumidifier, the absorption rate is also limited by thermal diffusion. When the heat released at the vapor-liquid interface due to phase change is not removed, there is an increase in temperature and equilibrium water vapor pressure at the interface. This increase in water vapor pressure lowers the rate of water vapor absorption.

Enhancement of water vapor absorption rates into LiBr have been pursued, yet few tangible results have been achieved due to the challenges of controlling thermohydraulic characteristics of a falling LiBr solution film. Yu et al., "Parametric Study of Water Vapor Absorption Into a Constrained Thin Film of Lithium Bromide Solution" *International Journal of Heat and Mass Transfer* 2012, 55, 5687-95 discloses a numerical model for the absorption characteristics of LiBr solution flows and that heat and mass transfer limits in a LiBr solution flow could be enhanced in flow channels with thicknesses less than a few hundred microns when employing high flow velocities. Thin solution high velocity flow reduces the heat diffusion path to the cooling surface beneath the solution film and a high solution flow velocity diminishes the thickness of any concentration boundary layer. Nasr et al. "Absorption Characteristics of Lithium Bromide (LiBr) Solution Constrained by Superhydrophobic Nanofibrous Structures" *International Journal of Heat and Mass Transfer* 2013, 63, 82-90 disclosed an experimental study where a LiBr solution flow is constrained by a superhydrophobic nanofibrous membrane with the absorption characteristics could be modified by control of the flow thickness and flow velocity to significantly increase absorption rates over those of falling films, where a solution film thicknesses on the order of about 100 μm was found to give superior results. However, the manifolding burden of an absorber having such a thin solution flow channel is high and tends to limit the capacity of the absorber. Hence, one is typically obliged to reduce the flow pressure drop by increasing the solution channel thickness, as flowing a fixed amount of mass through a 100 μm thick channel has approximately a 125 times greater pressure drop than that of a 500 μm thick channel. However, increasing the solution channel thickness also reduces the absorption rate, since transport within the solution flow as molecular diffusion is the sole mechanism for the absorbed molecule to be transported into the bulk absorbent, and mixing is needed to achieve high absorption rates.

Common desorbers for absorption refrigeration systems (ARSs) involve nucleate pool boiling or falling films over horizontal or vertical tubes which are the common configurations in lithium bromide (LiBr). In the pool boiling configuration, water is boiled from a pool of LiBr solution. In a falling film desorber, a LiBr solution is sprayed over a tube bundle while the heating medium flows inside the tubes. At low surface temperatures, water directly diffuses from the solution film when the solution temperature remains sufficiently high to sustain a solution water vapor pressure above the external vapor pressure. When the wall temperature sufficiently exceeds the solution saturation temperature, desorption also takes place from bubble nuclei formed at the solid-liquid interface.

A superheat temperature, which is the difference between the wall and solution saturation temperatures, of approximately 10° C. is required for boiling inception. Water bubble growth rate is significantly slow in the LiBr solution because of the low water diffusion coefficient in the solution. As in pure water, bubble growth in the LiBr solution is limited by mass diffusion rather than by heat transfer. Consequently, a significant surface superheat temperature is required to grow bubbles where the buoyancy force overcomes the surface tension and departure from the heat transfer surface.

An increase in the desorption rate and a reduction of the required surface superheat temperature are desirable for reducing the size of a desorber and lowering its heating medium temperature. For example, the use of an absorption cycle with solar-thermal collectors or photovoltaics with waste heat recovery is benefitted by a reduction of the required heat source temperature to enhance the prospect of directly converting solar heat into a cooling effect.

Mixing has been examined in laminar flow microchannels and involves inclusion of active or passive components. Active mixers, such as piezoelectric and magneto/electrohydrodynamic actuators or pressure perturbers place additional burden on the system. A passive approach is disclosed in Stroock et al. Chaotic Mixer for Microchannels" *Science* 2002, 295, 647-51 where chaotic advection is generated within the flow through stretching and folding the laminar streamlines due to ridges formed in the base of a channel. This passive mixture was employed to mix streams of liquids that are introduced at an inlet to an enclosed channel. The effect of such mixers on absorbers and desorbers where a vapor is included or excluded over the length of the channel has not been examined.

DETAILED DISCLOSURE

Embodiments of the invention are directed to absorbers and to desorbers that comprise a membrane over a microchannel that is three-dimensionally structured on at least the heat-exchanging surface to promote vortices for mixing of the temperatures and concentrations between the heat-exchanging and vapor-exchanging surfaces. These membrane absorbers and desorbers allow vapors to enter or exit the absorbers or desorbers, respectively, while retaining the flowing liquid. The 3D structured surfaces overcome diffusion limitations by incorporation of a textured surface, for example, one with staggered herringbone structures, and hereafter called "ridges", on the heat-exchanging surface, which is the flow channel's bottom wall.

Figure 1:
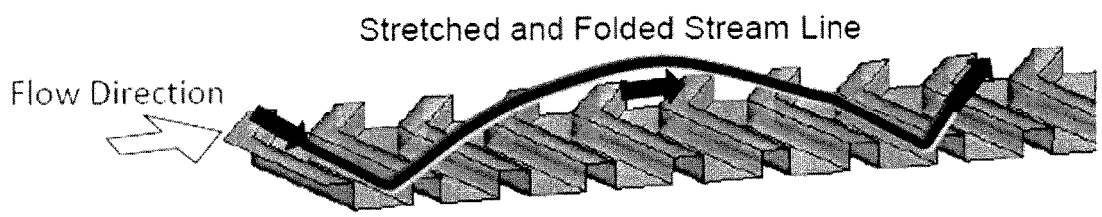
FIG. 1 show a 3D schematic of 3D-structured surface features and a fluid particle trajectory, streamline, as it enters and exits the spacing between the surface features and generates a z-direction velocity component in absorbers and desorbers, according to embodiments of the invention.

The ridges of the 3D-structured surface generate anisotropic resistance to the absorbent or desorbent flow, which stretches and twists portions of the volume of the flowing solution. Ridges of a few hundred microns in depth induce surface vortices with sufficient momentum to impact the main flow and continuously replenish the vapor-exchange surface with a concentrated solution. An exemplary 3D-structured surface that is conducive to the transfer of dilute and concentrated solution from the heat-exchanging surface to the vapor-exchanging surface is shown in FIG. 1.

By inducing the mixing of concentrated and dilute solutions of different temperatures, the efficiency of an absorber or desorber can be significantly improved relative to a base case, which lacks a 3D-structured heat-exchanging surface on the base of the microchannels. The ridges promote uniformity in the concentrations and temperatures across the cross-sectional area of the micro-channels proceeding down the length of the channels. In an embodiment of the invention, walls that are perpendicular to the heat-exchanging and vapor-exchanging surfaces can be thermally conductive to further enhance the temperature homogeneity possible in the channels. Such absorbers and desorbers are advantageous for use in absorption refrigeration systems (ARSB) and other applications.

Methods and Materials

Numerical Simulations

To formulate the problem, a continuum-based approach is used to assess the absorption/desorption process involved in 3D structured membrane absorbers/desorbers, according to embodiments of the invention. Fluid flow is modeled as steady, laminar, and incompressible. The governing equations for momentum, energy, and concentration can be written as:

$$u_j \frac{\partial u_i}{\partial x_j} = -\frac{1}{\rho}\frac{\partial p}{\partial x_i} + v \frac{\partial u_i}{\partial x_j \partial x_j} \quad (1)$$

$$u_j \frac{\partial T}{\partial x_j} = \alpha \frac{\partial T}{\partial x_j \partial x_j} \quad (2)$$

$$u_j \frac{\partial X}{\partial x_j} = D \frac{\partial X}{\partial x_j \partial x_j} \quad (3)$$

where u is the velocity, ρ is the solution density, v is the kinematic viscosity, p is the fluid pressure, T is the solution temperature, α is the thermal diffusivity, X is the solution concentration and D is the mass diffusivity. These equations reduce to the mathematical form:

$$\rho u_j u_{i,j} = -p_{,i} + v u_{i,jj} \quad (1')$$

$$u_j T_{,j} = \alpha T_{,jj} \quad (2')$$

$$u_j X_{,j} = D X_{,jj} \quad (3')$$

For example, in a membrane absorber, the vapor has to pass through the membrane pores before contacting the LiBr solution. Flow through a porous membrane can be classified as viscous, transitional, or free molecular flow regimes depending on the magnitude of the Knudsen (Kn) number. Kn number is defined as the ratio of the mean free path (λ) to the pore diameter ($d_p$):

$$Kn = \frac{\lambda}{d_p} \quad (4)$$

The mean free path is given by:

$$\lambda = \frac{k_b T}{\sqrt{2}\, \pi d^2 p} \quad (5)$$

where $k_b$ is the Boltzmann constant, T is the absolute temperature, d is the molecular diameter, and p is the vapor pressure. To calculate mass flux through the membrane, the flow regime must be established. The flow regime for a free molecular regime is characterized by Kn>10 and a transitional flow regime exists for 0.1<Kn<10. The vapor pressure at 5° C., which is the operating temperature of a typical evaporator, is 873 Pα. The diameter of the water molecule is 2.7×10⁻¹⁰ m. These values yield a water molecule mean free path of 13 μm. As the optimal membrane pore size for an absorber application is anticipated to be less than 1 μm such membranes possess a reasonable liquid breakthrough pressure with a vapor flow through the membrane pores in the transitional or free molecular flow regime. According to the Dusty-Gas model, mass transfer through a membrane consists of diffusion and viscous fluxes where the molar diffusion flux is given by:

$$N^D = D_e^k \frac{-1}{RT} \Delta p \quad (6)$$

-continued $$D_e^k = \frac{2\varepsilon r}{3\tau}\sqrt{\frac{8RT}{\pi M}} \quad (7)$$

where R is the gas constant, M is the molecular weight, r is the pore radius, ε is the membrane porosity, and τ is the membrane tortuosity. The molar viscous flux is given by:

$$N^V = \frac{-p}{RT\mu}\frac{\varepsilon r^2}{8\tau}\Delta p \quad (8)$$

where μ is the viscosity and p is the pressure. The total mass flux through the membrane pores can be written as the sum of the diffusion and viscous fluxes:

$$N = N^D + N^V \quad (9)$$

The vapor mass flux through the membrane can be then computed from:

$$J = k_m(p_v - p_i), \quad (10)$$

$$k_m = -\frac{M}{\delta_m}\left(\frac{D_e^k}{RT} + \frac{pB_0}{RT\mu}\right)$$

where $k_m$ is the membrane mass transfer coefficient or permeability, $p_v$ is the water vapor pressure, $p_i$ is the water vapor pressure of the solution at the interface and $\delta_m$ is the membrane thickness.

To evaluate the accuracy of Equation 10, permeability of nanofibrous membranes with different pore sizes were experimentally measured. Nanofibrous membrane with a pore size of 1 μm has a relatively low pressure drop compare to the overall pressure potential that drives the absorption process. Tests were performed at a flow rate of up to 0.01 kg m$^{-2}$ s$^{-1}$ and an absolute pressure of 0.85 kPα. The results are within 5% of those predicted by Equation 10. Measurements on a 160-μm-thick solution film over an absorption rate of 0.002-0.006 kg m$^{-2}$s$^{-1}$ suggested that the dominant resistance is mass transfer through the solution ($P_i$-$P_s$) and membranes only contribute approximately 20% to the overall resistance.

Modeling assumes that the LiBr solution and the vapor are in an equilibrium state at the membrane surface. Mass fluxes across the membrane and heat transfer to the vapor phase through the membrane are assumed to be negligible compared to mass flux along the channel. Therefore, the heat and mass boundary conditions at the membrane surface are:

$$k(T, X)\frac{\partial T}{\partial n} = h(T, X) \cdot k_m(p_v - p_i(T, X)) \quad (11)$$

$$D(T, X) \cdot \rho(T, X)\frac{\partial X}{\partial n} = k_m(p_v - p_i(T, X)) \quad (12)$$

where h is the latent heat of evaporation, ρ is the solution density, and n is the interface normal direction. LiBr properties are those reported by McNeely, "Thermodynamic Properties of Aqueous Solutions of Lithium Bromide", ASHRAE Trans 1979, 85, 413-34.

No-slip and no-flux boundary conditions are used for momentum and the concentration equations, respectively, at the heat exchanging cooling surface with a linear temperature distribution. The temperature and concentration are specified at the inlet and a zero gradient boundary condition was used for the temperature and the concentration at the outlet. Symmetric conditions are applied on the sides of the flow domain.

++To solve the governing equations (1-3) with the boundary conditions, an in-house computational fluid dynamics solver based on the Lattice Boltzmann Method (LBM) was used with a finite difference method for the concentration and temperature fields. In the LBM, the fluid is simulated by fictive particles with a mass distribution function of $f(\vec{x}, \vec{e}, t)$. The motion of these particles is set from the solution of the Boltzmann equation with BGK approximation over a discrete lattice mesh. The popular single relaxation time (SRT) model, with the time step δt and space step $e_\alpha$ δt, is:

$$f_\alpha(X_i + e_\alpha \delta t, t + \delta t) - f_\alpha(X_i, t) = -\frac{1}{\lambda}\left[f_\alpha(X_i, t) - f_\alpha^{(eq)}(X_i, t)\right] \quad (13)$$

where $e_\alpha$ is the discrete particle velocity set, λ the normalized relaxation time, and $X_i$ a point in the discretized physical space. The viscosity in the N–S equation derived from Equation (13) is:

$$v = \left(\lambda - \frac{1}{2}\right)c_s^2 \delta t \quad (14)$$

where $C_s$ is the speed of sound, where this choice of the viscosity makes formally the LBGK scheme a second order method for solving incompressible flows. The positivity of the viscosity requires that λ>0.5. The term $f_\alpha(Xi, t)$ is the discretized distribution function associated with the α-th discrete velocity $e_\alpha$ and $f_\alpha^{(eq)}$ is the corresponding equilibrium distribution function. The macroscopic quantities, such as mass density ρ and momentum density ρu, can be obtained by evaluating the hydrodynamic moments of the distribution function f as follows:

$$\rho = \sum_\alpha f_\alpha^{eq} \quad (15)$$

$$\rho\bar{u} = \sum_\alpha f_\alpha^{eq}\vec{e}_\alpha \quad (16)$$

The grid dimensions of the computational domain were 5 μm in all three directions. A grid independence study was performed to ensure that the computational results are independent of the grid size. The maximum error in the absorption rate was found to be less than 2% when the grid size was reduced by a factor of 2.

Figure 2A:
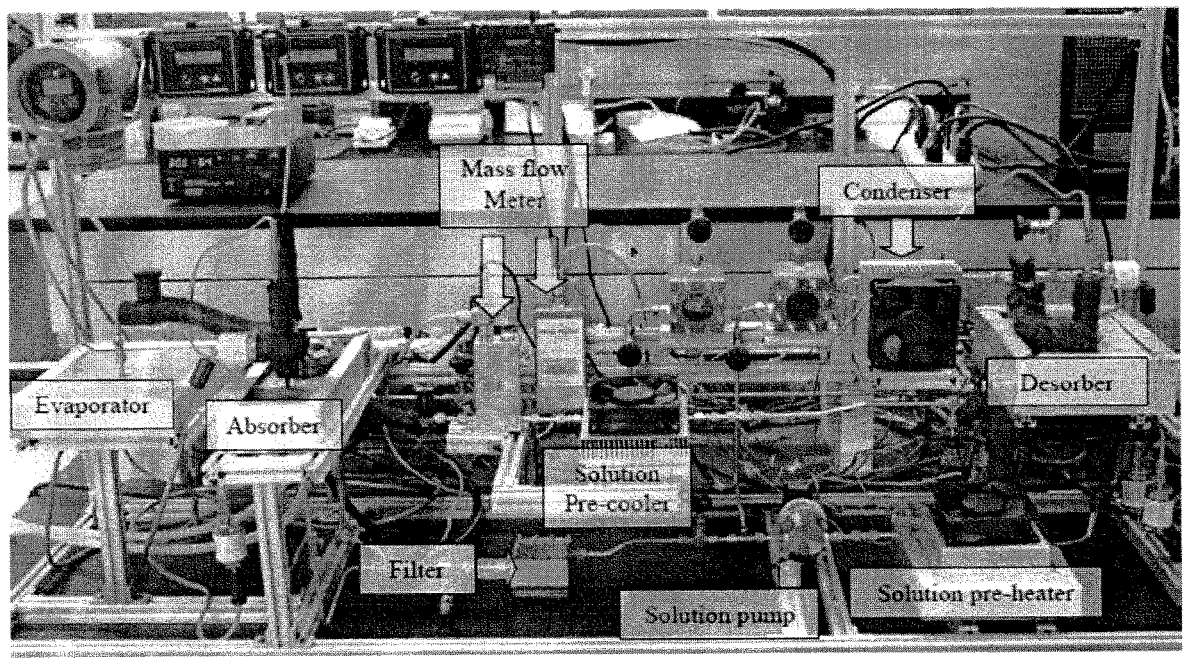
FIG. 2A shows a photograph of the assembled ARS-like system employed in an experimental setup using an absorber, according to an embodiment of the invention.
Figure 3A:
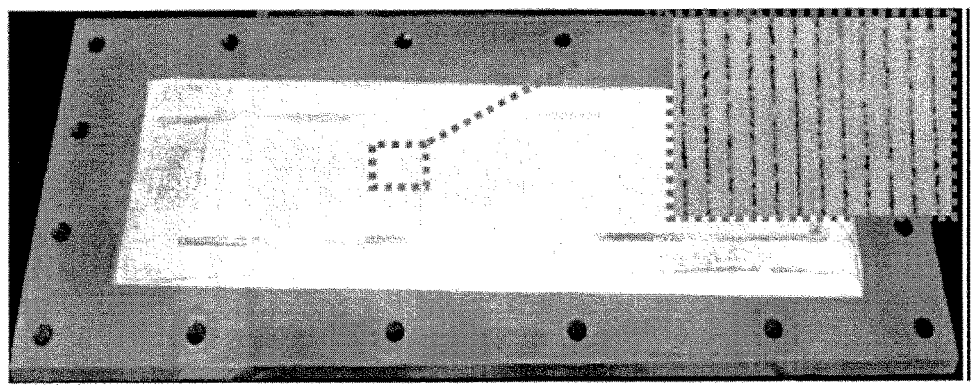
FIG. 3A shows a photograph of an absorber, according to an embodiment of the invention, having a PTFE membrane bonded over its vapor-exchanging surface.

FIG. 2A depicts a photograph of an exemplary setup used for generation of experimental data, with an absorber, according to embodiments of the invention. The experimental loop consists of a LiBr solution line and a refrigerant, water, line. The solution line consists of an absorber, desorber, pump, filter, solution reservoir, Coriolis mass flow meter, and two solution heat exchangers. A photograph of the absorber with a polytetrafluoroethylene (PTFE) membrane bonded over its surface is shown in FIG. 3A. The water line consists of an evaporator, condenser, Coriolis mass flow meter, and a water reservoir. In the solution line, a micro gear pump (HNP Mikrosysteme, Germany) drives the weak LiBr solution to a Coriolis mass flow meter (Bronkhorst, USA) into and through a solution heat exchanger where the solution is preheated to a desired temperature before entering the desorber. In the desorber, the weak LiBr solution is heated by a thin film heater (Omega Engineering, CT) to desorb water. The desorbed water vapor flows to a condenser and the strong LiBr solution exits the desorber and flows through a heat exchanger, where it is cooled to a preset temperature before it enters the absorber. The condensed water leaves the condenser and flows through a Coriolis mass flow meter (Micro Motion, CO) to the evaporator, where it is vaporized as the vapor supplied to the absorber. The concentrated solution flows through the absorber, absorbing the water vapor generated in the evaporator. The dilute solution leaving the absorber flows through a filter and is pumped back to the solution pre-heater and the desorber to complete the cycle. The desorber and evaporator heat exchangers are heated by flexible heaters. The experimental loop is equipped with two small reservoirs with sight glass to monitor the liquid in the solution and in the water lines. These reservoirs serve as compensation chambers and assist in charging of the loop. The data are measured by pressure transducers, thermocouples, and mass flow meters; and are recorded by a data acquisition system.

The system solution loop was charged with a 55% LiBr solution inhibited by Lithium Molybdate (Leverton-Clarke Ltd, UK). The water line was charged with degassed and deionized water. Each experimental run began by operating the solution pump and setting the flow rate to a desired value. Subsequently, the water chiller was turned on and the temperature of the absorber cooling water was set. A valve between the evaporator and absorber was then opened to begin the absorption process. Next, the TEC modules were turned on and the inlet temperatures to the absorber and desorber heat exchanges were set. Once the desired temperatures were reached, the desorber and evaporator heaters were powered. Changes in temperatures, pressures, and mass flow rates were monitored continuously. The system was assumed to have reached steady-state when variations in the absorber pressure and the solution density were within 10 Pa and 5 kg/m³, respectively, for at least 30 minutes. The absorption rate was directly measured by the water line mass flow meter.

The accuracy of the water mass flow meter that directly measures the water absorption rate is ±1%. However, due to the unsteady nature of the condensate flow, a fluctuation of up to ±5% was recorded during the experiment. The reported absorption rates are the average of the measured values over a period of time, after the system reached a steady state. The concentration uncertainty is calculated using the following equation:

$$\Delta X = \sqrt{\left(\frac{\partial X}{\partial \rho}\Delta\rho\right)^2 + \left(\frac{\partial X}{\partial T}\Delta T\right)^2}$$

where X and T are the solution concentration and temperature, respectively, and ρ is the solution density. Table 1 lists uncertainty in all measurements.

TABLE 1

Variable uncertainties

| Variable | Uncertainty |
| --- | --- |
| Pressure | 0.5% |
| Density (kg/m³) | 5 kg/m³ |

TABLE 1-continued

Variable uncertainties

| Variable | Uncertainty |
| --- | --- |
| Absorption rate | 5% |
| Solution flow rate | 0.2% |
| Temperature | 0.3° C. |

Figure 4A:
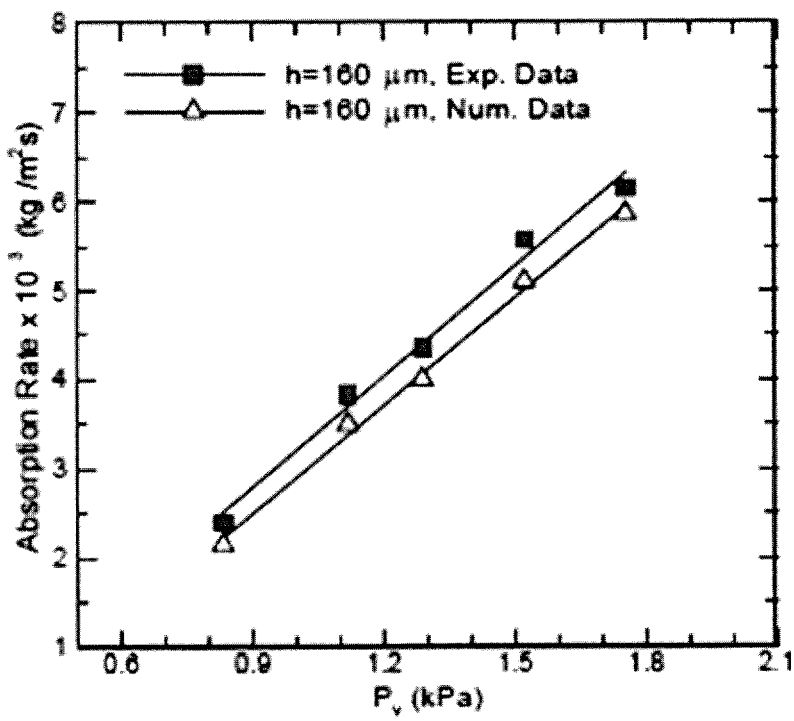
FIG. 4A shows plots of experimental and calculated absorption rates as a function of vapor pressure of absorbers, according to an embodiment of the invention.
Figure 4B:
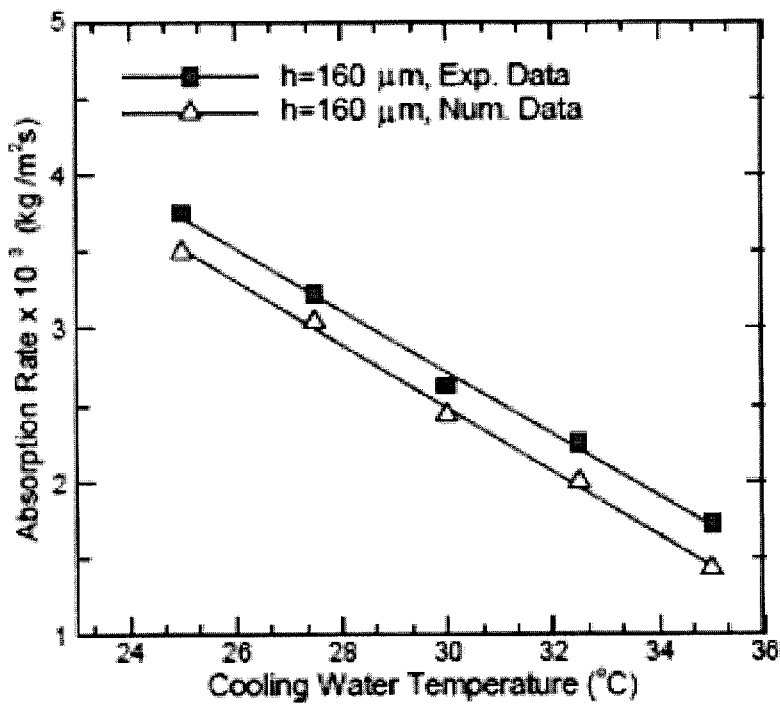
FIG. 4B shows plots of experimental and calculated absorption rates as a function of cooling water temperature of absorbers, according to an embodiment of the invention.

Initially, the water vapor pressure was increased while other test parameters were held constant. FIG. 4A shows the effect of water vapor pressure on the absorption rate. The results clearly show that increasing the water vapor pressure (Pv) linearly increases the absorption rate. The variation of the solution water vapor pressure (Ps,w) on the absorption rate was tested, the solution water pressure was changed while the vapor pressure was held constant. Solution water pressure varies with the solution temperature and concentration. The change in the solution pressure was achieved by varying the solution channel wall temperature from 25 to 35° C. in 2.5° C. increments. All other conditions were held constant. As indicated in FIG. 4B, there is a linear decrease in absorption rate with an increase in solution temperature, which increases the solution water vapor pressure. All absorption rates given FIGS. 4A and 4B are normalized with respect to the pressure potential (Pv–Ps) and are plotted in FIG. 4C. The solution water pressure used in the calculation is the average of the absorber inlet and exit. The results are consistent with an absorption rate that linearly increases with the pressure potential regardless of the source of pressure change.

FIGS. 4A and 4B give numerical results where experimental data agree within 15%. This difference between the numerical and experimental results can be attributed to uncertainty in the film thickness, potential inaccuracy in the solution water vapor pressure correlations used in numerical simulations, and non-uniform wall temperature in the experiment.

The validated numerical model given above was used to analyze the impact of chaotic advection on absorption characteristics of a thick absorbent flow constrained by a membrane. Table 2, below, lists input parameters of the model. The temperature of the channel bottom wall, the 3D structured heat exchanging surface, was set to vary linearly from 27.5° C. at the solution outlet to 32.5° C. at the solution inlet, to mimic a counter flow heat exchanger configuration.

TABLE 2

Input parameters of the numerical model

| Parameter | Value |
| --- | --- |
| Vapor saturation temperature, $T_v$ | 5° C. |
| Inlet solution temperature, $T_i$ | 32.5° C. |
| Inlet solution concentration, $C_i$ | 60% |
| Solution mean velocity, u | 0.05 m/s |
| Membrane porosity, ε | 60% |
| Membrane pore diameter, $d_m$ | 1 μm |
| Tortuosity, τ | 1.0 |
| Membrane thickness, $\delta_m$ | 20 μm |
| Absorbent channel height, CH | 500 μm |
| Channel length, L | 600 mm |

Figure 5A:
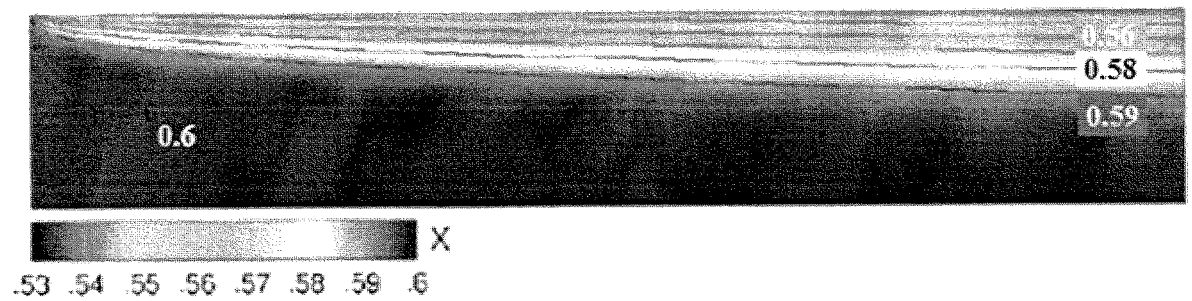
FIG. 5A shows a map of LiBr solution concentration within a 500-micron-thick and 600-mm-long flow channel for a base case simulation lacking 3D-structures, using parameters provided by Table 2 as input to the simulation.

FIG. 5A provides the concentration contours within the flow channel. A scale factor of 0.005 is used in the x direction to show the entire flow domain. The absorbate, water vapor, is absorbed into the absorbent (LiBr solution) at the membrane-absorbent interface, the vapor-exchanging surface. As the solution flows through the channel, the thickness of the concentration boundary layer formed at that interface increases. The boundary layer acts as a resistance to mass transfer between the interface and the bulk of the solution. The results clearly suggest that most of the solution is not involved in the absorption process and leaves the channel at a high concentration.

Figure 6:
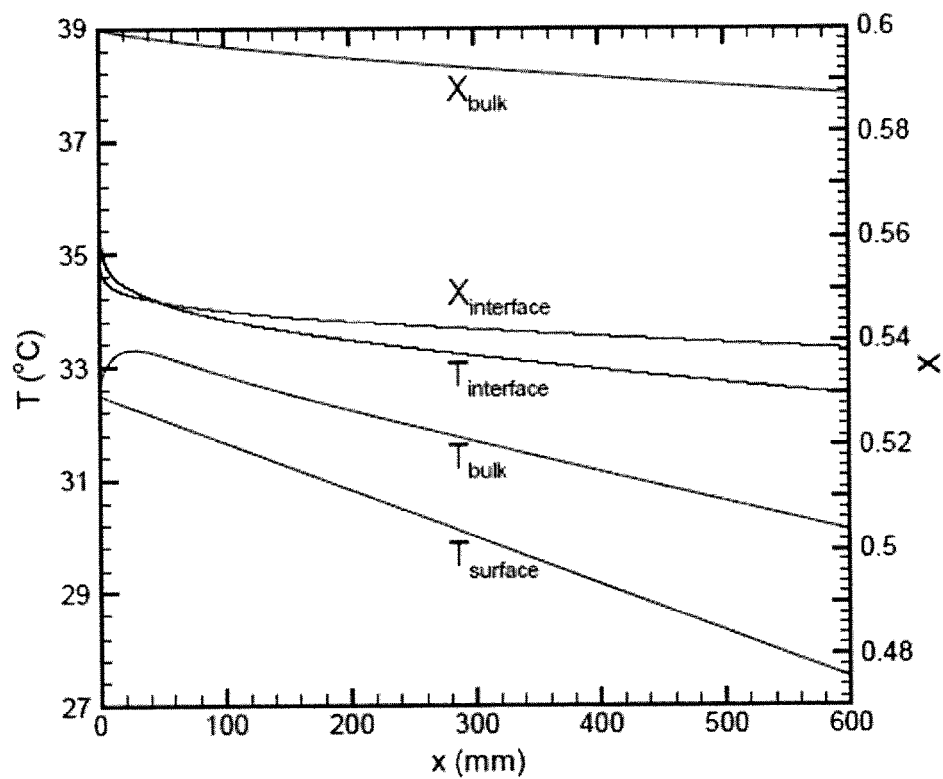
FIG. 6 shows a plot of the variations of temperature and concentration at the vapor-exchanging surface, labeled interface, and within the bulk along the flow channel of a base case absorber.

Variations between the bulk and interface concentrations along the channel are plotted in FIG. 6. At the channel inlet, a high solution concentration, with its low water vapor pressure in the solution phase, results in rapid absorption of the water vapor into the solution. This high absorption rate results in a sharp decline in the solution concentration at the interface. However, due to the low diffusion rate of the water molecules through the solution, this change is not reflected within the bulk flow. While the interface concentration decreases by 6.2%, from 60% to 53.8%, over the 600 mm length of the channel, the average bulk concentration decreases by only 1.2%, from 60% to 58.8%, over that length.

Figure 5B:
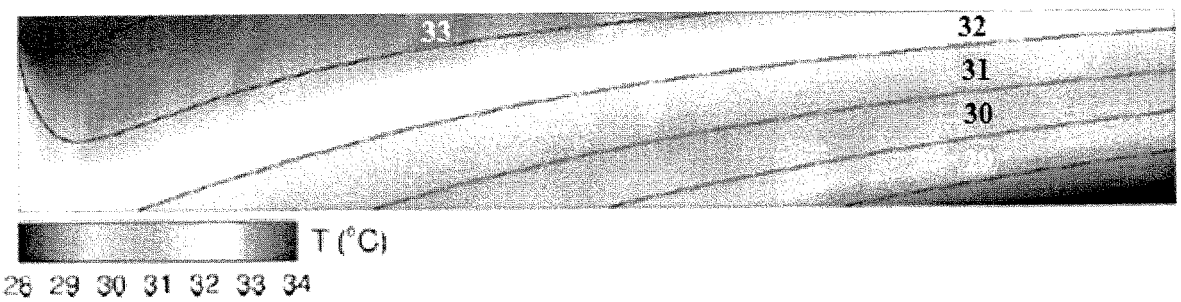
FIG. 5B shows a map of temperature contours within a 500-micron-thick and 600-mm-long flow channel for a base case simulation lacking 3D-structures, using parameters provided by Table 2 as input to the simulation.

FIG. 5B depicts temperature distribution within the flow. The results show a sudden increase in temperature of the interface at the channel inlet due to the release of heat at a high absorption rate where the solution is at its highest concentration. The high absorption rate causes a sizeable increase in the bulk temperature at the channel inlet. However, the relatively high heat diffusion rate in the LiBr solution results in rapid cooling of the interface. Thereafter, both the interface and the bulk temperatures closely follow the heat exchanging, cooling, surface temperature. Comparisons of the interface and bulk values of the temperature and concentration profiles indicate that the absorption process is mass-transfer limited.

Figure 4C:
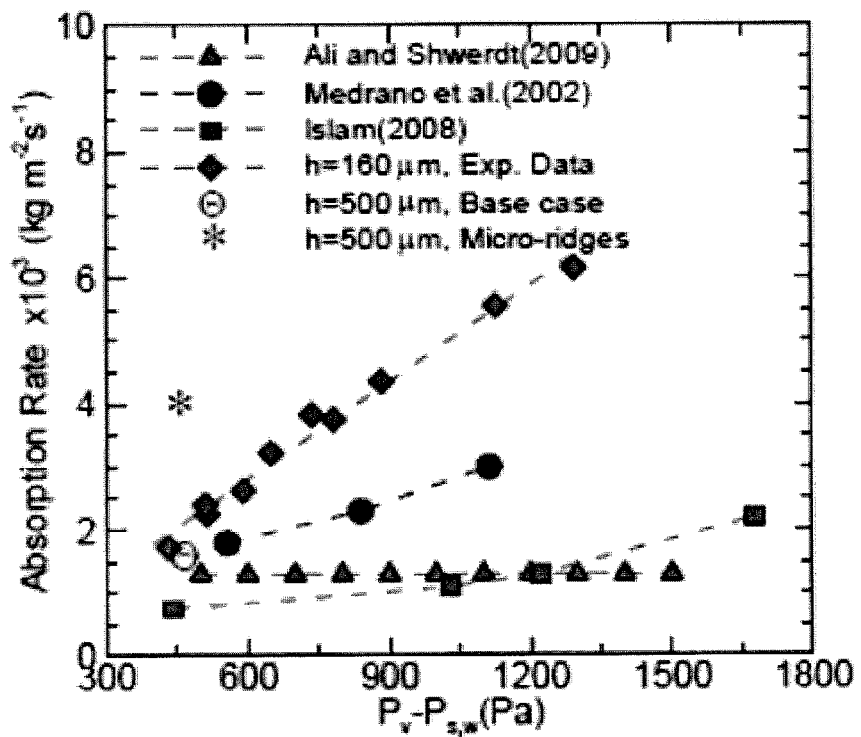
FIG. 4C shows plots of absorption rates as a function pressure potential, of base case absorbers, and absorbers, according to an embodiment of the invention, with comparison to prior art absorbers.
Figure 7:
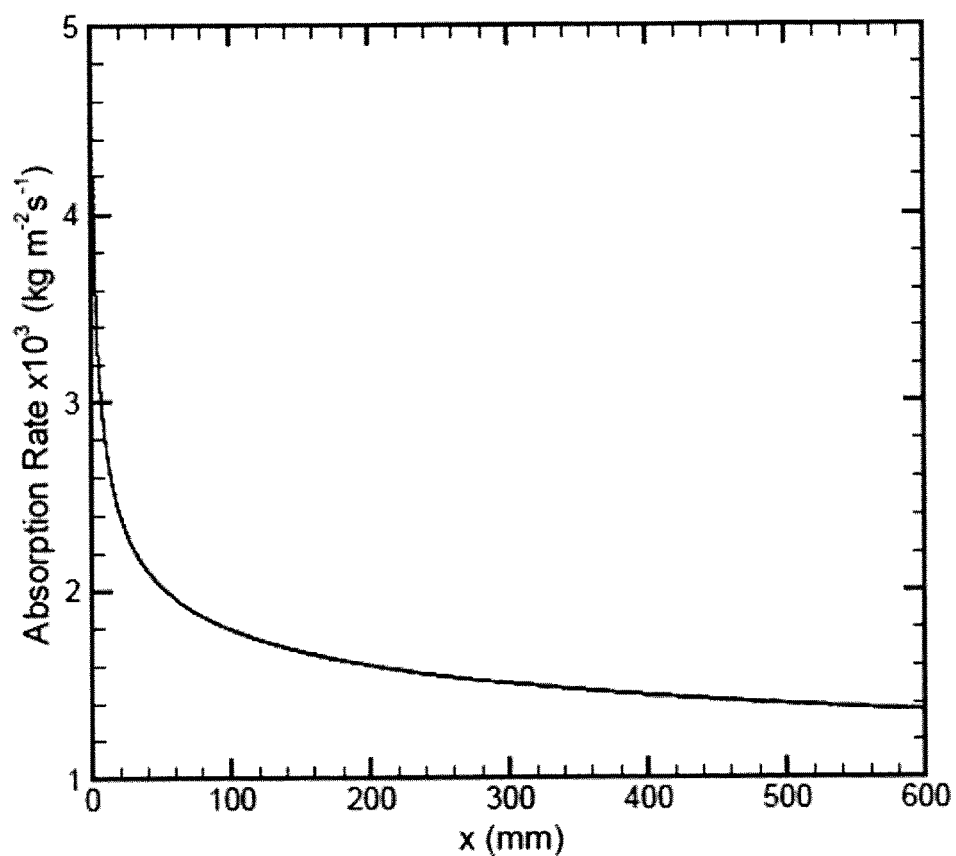
FIG. 7 shows a plot of the variations of absorption rate along the length of a base case solution channel.

FIG. 7 shows a plot of the water vapor absorption into the solution film. The highest absorption rate is indicated at the channel inlet where the most highly concentrated solution is present. The absorption rate thereafter declines as the concentration boundary layer near the vapor-solution interface grows. The average absorption rate over the entire channel length is 0.0016 kg/m²s, as indicated in FIG. 4C.

Figure 8:
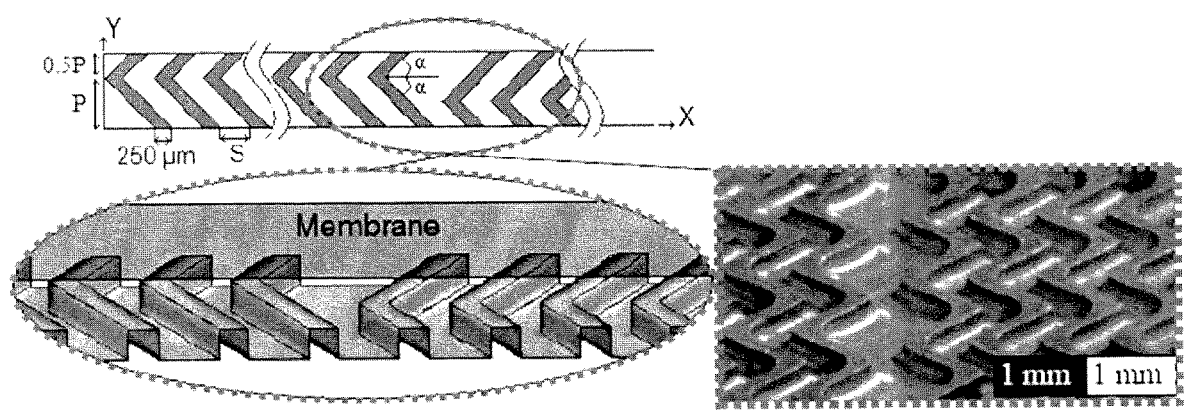
FIG. 8 shows a top view indicating the geometric features tabulated in Table 3, a 3D schematic of a flow channel with a 3D-structured heat-exchanging surface showing the ridges, and a photograph of a herringbone 3D-structured heat-exchanging surface made of cupper through a wet etching process, for absorbers and desorbers, according to embodiments of the invention.

The heat and mass transfer process of the base case is diffusion dominated, since the flow is laminar ($R_e$=7). The diffusion limitations are overcome by incorporation of staggered herringbone structures, hereafter called "ridges", on the heat exchanging flow channel bottom wall. The ridges generate anisotropic resistance to the absorbent flow, which stretches and twists a portion of the absorbent flow volume. A parametric study is conducted to determine the optimal ridge geometry for a membrane-based absorber. Table 3, below, provides the list of variables and their range used in the numerical simulations. The variables RH, CH, S, α, P and J are the ridge height, channel height, distance between the ridges in the x-direction, ridge angle with respect to the x-axis, ridge length in the y-direction, and the absorption rate, respectively. The simulation results discourage a 3D-surface comprised of relatively shallow ridges, for example, 100-μm in depth with RH/CH=0.2, as that surfaces impact on the absorption rate is small. The results recommend ridges of a few hundred microns in depth to induce surface vortices with sufficient momentum to impact the main flow and continuously replenish the interface at the vapor-exchanging surface with a concentrated solution. Comparison of the absorption rates with a RH of 100, 300, and 500 μm shows that the absorption rate increases proportionally to the ridges' depth. However, current scalable and economical micro-manufacturing technologies are limited for the production of deep ridges. For example, the wet etching process utilized for these experiments does not permit a depth to width ratio of more than one, and a ridge height of 300 μm was selected. Simulated geometries indicate that the maximum performance is achieved at α=30°, S=600 μm, and P=660 μm. Simulation indicates that ridges having long and short arms, alternated after approximately 40 ridges, as shown in FIG. 8, produce high absorption rates.

TABLE 3

Effect of the ridge geometry on the absorption rate

| RH (μm) | RH/CH | S (μm) | α (°) | P (μm) | J × 10³ (kg m⁻²s⁻¹) |
|---|---|---|---|---|---|
| 100 | 0.2 | 500 | 45 | 500 | 2 |
| 300 | 0.6 | 500 | 45 | 500 | 3.4 |
| 500 | 1 | 500 | 45 | 500 | 3.7 |
| 300 | 0.6 | 600 | 45 | 500 | 3.5 |
| 300 | 0.6 | 800 | 45 | 500 | 3.4 |
| 300 | 0.6 | 600 | 30 | 500 | 3.7 |
| 300 | 0.6 | 600 | 15 | 500 | 3.1 |
| 300 | 0.6 | 600 | 30 | 660 | 4 |
| 300 | 0.6 | 600 | 30 | 1320 | 3 |

Figure 9:
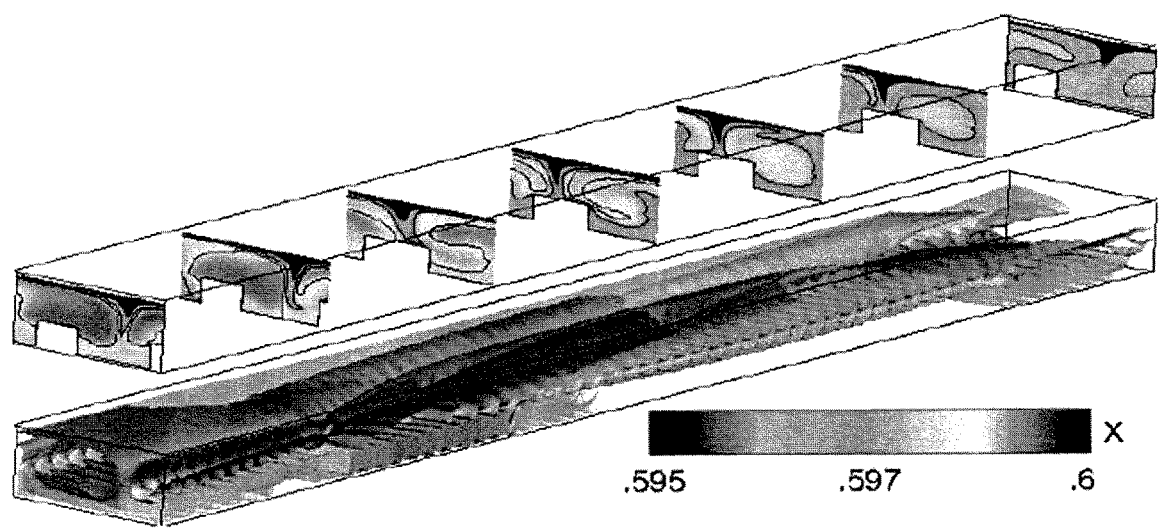
FIG. 9 shows a 3D projection of concentration contours including two vortices formed on the short and long arms of the micro-ridge of a channel of a 3D structured absorber, according to an embodiment of the invention.

FIG. 9 illustrates how the surface induced vortices control the concentration distribution within the flowing fluid. At any given cross-section, two vortices are formed, one on each arm of the ridge. The concentration contours indicate that low concentration solution at the vapor-exchanging surface is advected downward towards the bottom of the channel to the heat-exchanging surface by the transverse velocity generated by the vortices. Switching between the ridges, as shown in FIG. 8, reorganizes the vortices across the cross-section to mix more dilute solution with more concentrated solution at the center of the larger vortex. The concentration contours at different cross-sections of the flow channel is illustrated in FIG. 9 for this process.

Figure 10:
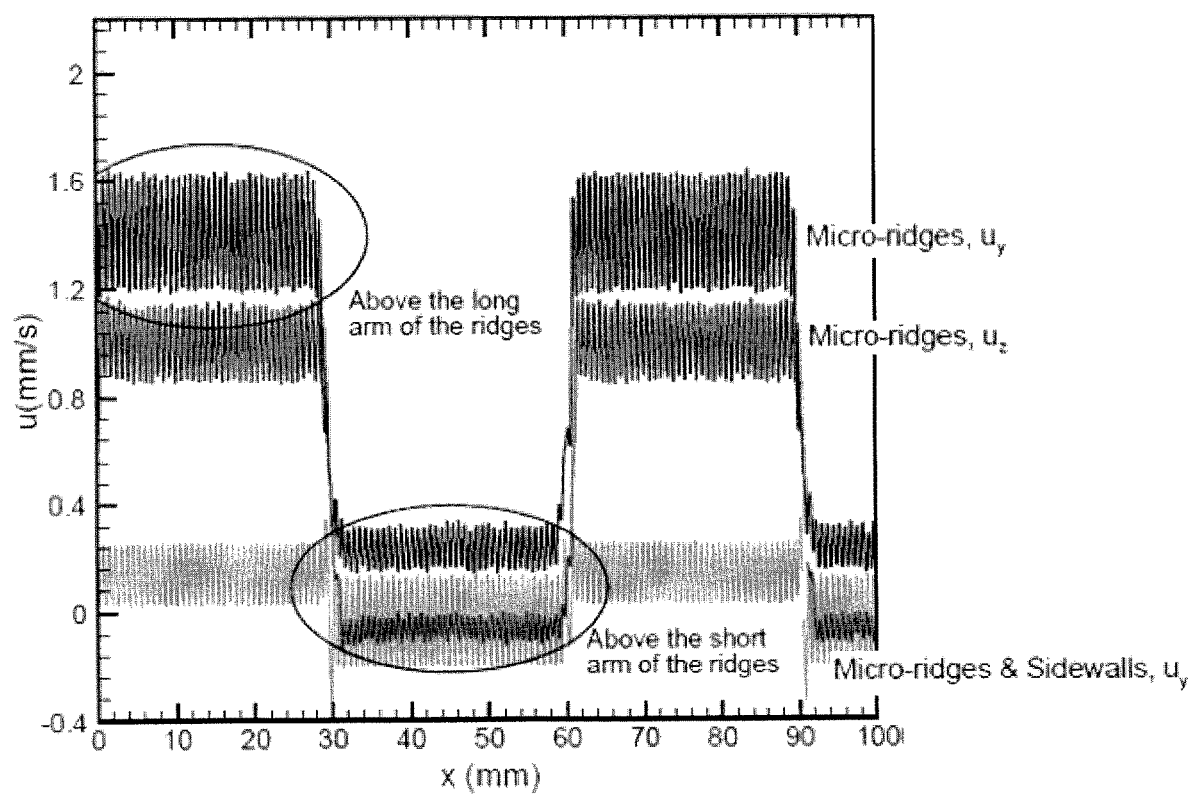
FIG. 10 shows a plot of the variations of y and z components of the velocity vector along a microchannel at y=180 µm and z=750 µm for channels of a base case and channels with and without thermally conductive sidewalls, according to embodiments of the invention.

FIG. 10 shows the y and z components of the velocity vector along the microchannel at y=180 μm and z=750 μm, which is 50 μm below the vapor-exchanging surface. The results show a major difference of approximately 4- to 5-fold between the y component of the velocity on the long and short ridges. The maximum transverse velocity in the y direction occurs on the long arm of the ridges and the average value of the y-velocity is 1.4 mm/s, which is 12% of the x component of the velocity.

Figure 11A:
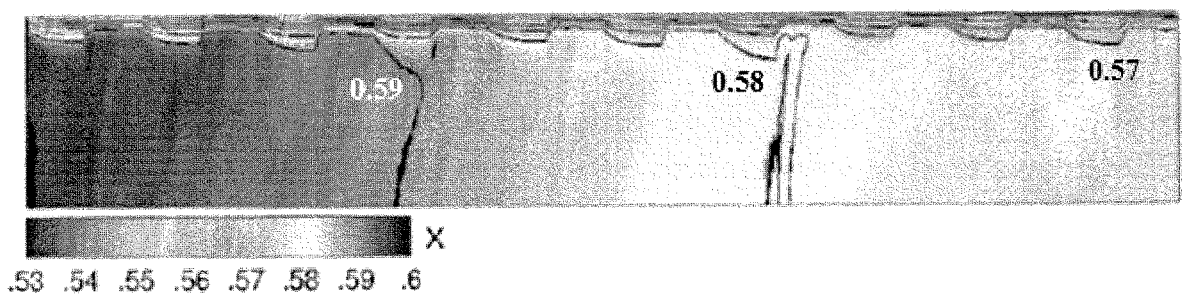
FIG. 11A shows a map of LiBr solution concentration within a 500-micron-thick and 600-mm-long flow channel incorporating micro-ridges on the heat-exchanging surface of the channel of an absorber, according to an embodiment of the invention, using parameters provided by Table 2 as input to the simulation.

FIG. 11A illustrate the concentration contours at y=180 μm cross section. The results clearly illustrate how ridges substantially change the concentration distribution in the absorbent film. The solution is well mixed such that mass transfer inside the flow channel is not dominated by molecular diffusion. The surface induced vortices take absorbent from the bulk solution to the vapor-liquid interface and continuously disturb the concentration boundary layer growth as the absorbed water molecules are advected from the vapor-exchange surface to maintain a high solution concentration at the vapor-exchange surface.

Figure 11B:
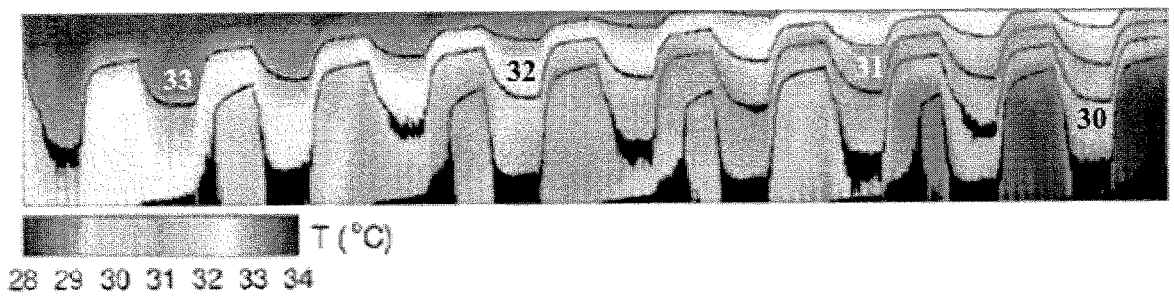
FIG. 11B shows a map of temperature contours within a 500-micron-thick and 600-mm-long flow channel incorporating micro-ridges on the heat-exchanging surface of the channel of an absorber, according to an embodiment of the invention, using parameters provided in Table 2 as input to the simulation.

The temperature contours, shown in FIG. 11B, indicate that the advection process significantly impacts the temperature gradient. The mixing of the warm solution from the vapor-exchange surface with the relatively cool bulk solution distributes the interface heat throughout the bulk. However, because the diffusive heat transport from the heat-exchanging surface is significant, exceeding the advective heat transport, a thermal gradient in the z-direction is established and maintained.

Figure 12:
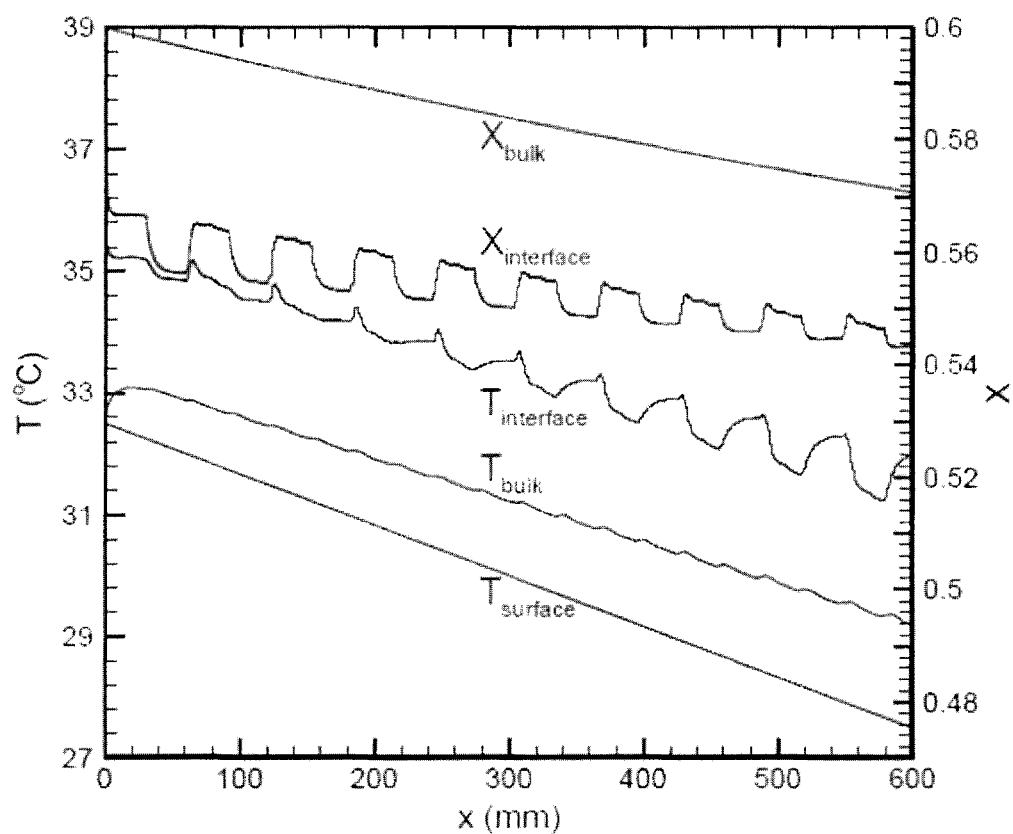
FIG. 12 shows a plot of temperature and LiBr concentration at the vapor-exchanging surface, labeled interface, and within the bulk solution along a flow channel incorporating micro-ridges on the heat-exchanging surface, according to an embodiment of the invention.

The role of mixing in the absorption process is indicated by variations of the interface and bulk values of the concentration and temperature, as plotted in FIG. 12. In contrast to the base case, illustrated in FIGS. 5A and 5B, the bulk concentration, $X_{bulk}$, more closely resembles the interface concentration, $X_{interface}$, with about a 2% difference throughout the entire channel length. A significant fluctuation, of about 0.5%, is observed in the interface concentration. The mixing process involves two vortices forming over the long and short arms of the ridges, which is responsible for the smaller variation in bulk and vapor-exchange interface concentrations and temperatures. The difference in the strength of the two vortices is highlighted in FIG. 10, where the y component of velocity on the long arm of the ridge is seen to be 4 to 5 times larger than y component of velocity over the short arm of the ridges. Reduction in the y component of the velocity, at x=30 mm, slows the interface replenishment process, resulting in a decrease in the vapor-exchange interface concentration which increases again when the solution flows over the long arms of the ridges, at x=60 mm. This structuring also produces fluctuation of the interface temperature.

Figure 13:
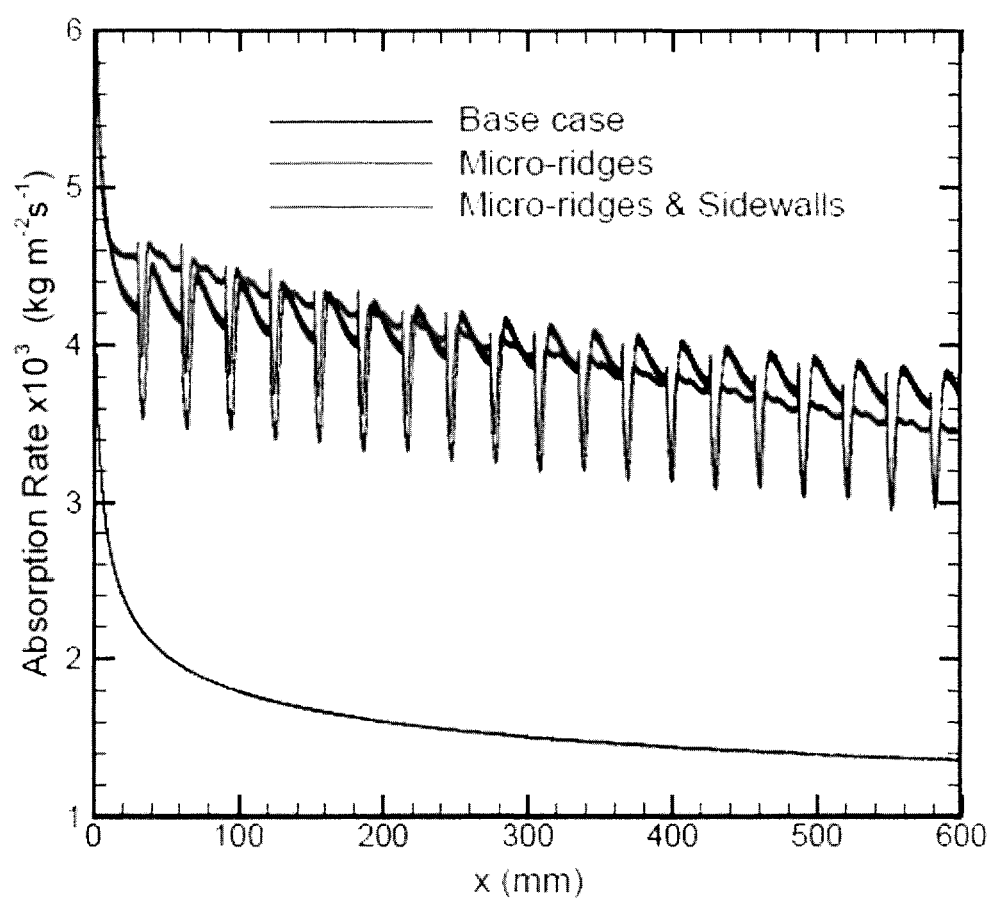
FIG. 13 shows plots of the absorption rate along the length of absorbers for a base case absorber, an absorber with 3D-structured ridges, according to an embodiment of the invention, and an absorber with 3D-structures and thermally conductive walls, according to an embodiment of the invention.

FIG. 13 plots absorption rates along a channel's length. As in the base case, shown in FIG. 7, the high absorption rate at the channel inlet quickly declines within a short distance from the inlet for the 3D-structured channels; however, the rate of decline is significantly less than that of the base case. The absorption rate stabilizes at a much higher rate than that of the base case due to the fact that the modified fluid flow replenishes the vapor-exchange surface with a concentrated solution. This absorption rate fluctuates. At each fluctuation, the absorption rate reaches a maximum within a short flow distance, after which the absorption rate declines. By switching between the position of the short and long arms of the ridge, in the manner indicated in FIG. 8, the absorption rate again increases. Alternating between the two surface patterns continuously brings the concentrated solution from the middle of the vortices to the vapor-liquid interface, as indicated in FIG. 9. This alternation is critical to maintaining a high absorption rate. If this alternation does not take place, the absorption rate continuously declines. Overall, the process results in an average absorption rate of 0.004 kg/m²s, which is approximately 2.5 times higher than the absorption rate achieved in the base case, as is indicated in FIG. 4C.

The enhancement in the absorption rate proportionally increases the heat release at the vapor-exchange interface. These results also indicate a significant fluctuation in the interface temperature. The amplitude of these fluctuations increases as the difference between the solution temperature at the vapor-exchange surface and at the heat-exchange, cooling, surface increases along the channel.

Figure 14:
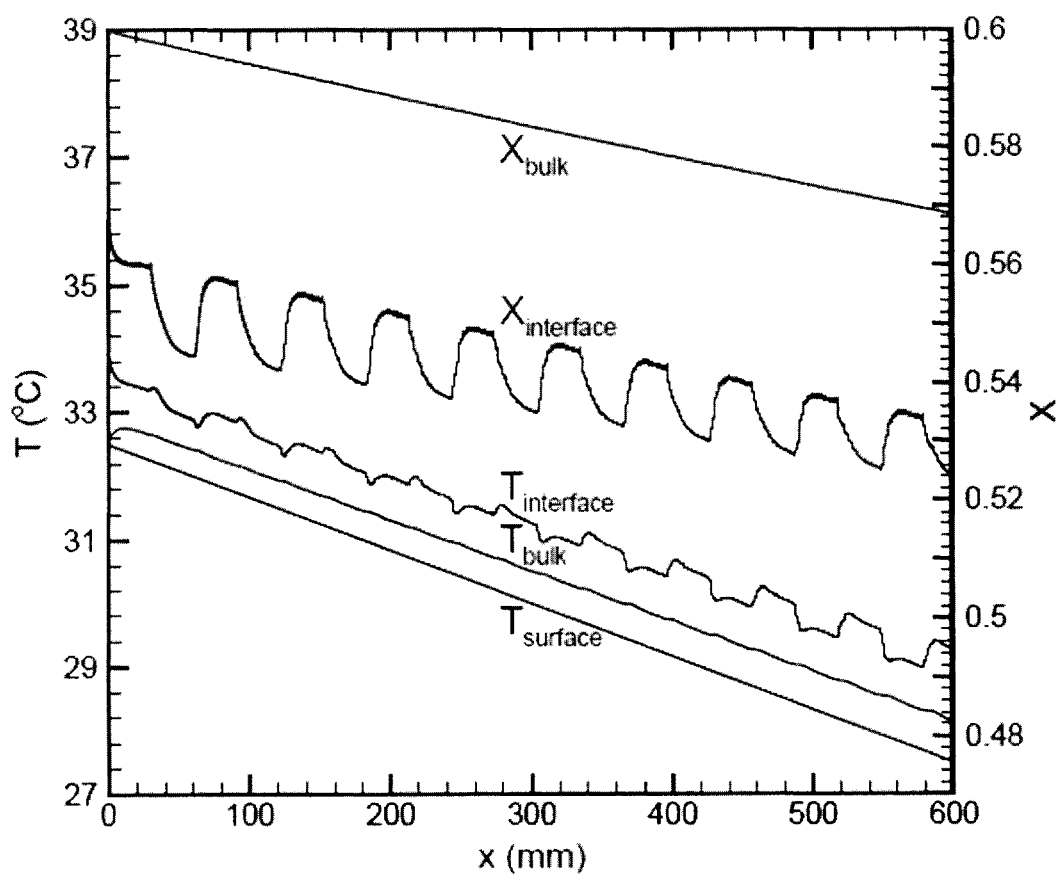
FIG. 14 shows a plot of the temperature and concentration at the vapor-exchanging surface, labeled interface, and in the bulk solution along the length of the flow channel having 3D-structured ridges and heat conducting sidewalls, according to an embodiment of the invention.

Implementation of the surface vortices enhances absorption rates. This increase in the absorption rate resulted in significant heating of the solution and increased the difference between the vapor-exchange surface and the heat-exchange surface. To better cool the solution, the sides of the channel are thermally conductive walls. In addition to impacting the heat transfer field, the thermally conductive side walls facilitate membrane assembly over the flow channels, as illustrated in FIG. 3A. FIG. 14 plots the temperature and concentration profiles for channels with thermally conductive side walls, where the average temperature difference between the vapor-exchanging surface and the heat-exchanging surface reduces to 1.27° C., from 3.45° C. when there are no thermally conductive side walls. However, inclusion of side walls weakens the strength of the vortices, as evidenced by the decrease in the y component of the velocity, as indicated in FIG. 10. The difference between the concentrations at the interface and bulk, as shown in FIG. 14, with the difference where no sidewalls are present, as plotted in FIG. 12, indicate that by adding sidewalls the concentration difference increases from 3.25% to 4.3%. Hence, although adding sidewalls reduces heat transfer resistance, the addition slightly increases mass transfer resistance. The overall impact of adding the sidewalls to the absorption rate is indicated in FIG. 13. A decline in the absorption rate occurs at the beginning of the channel with inclusion of sidewalls, which can be attributed to a reduction in the transverse velocity. However, due to a significant improvement in the solution cooling process; a higher absorption rate is achieved over the latter portion of the channel's length. Overall, adding thermally conductive sidewalls results in a small improvement of the absorption rate to 0.0042 kg/m²s.

Figure 15:
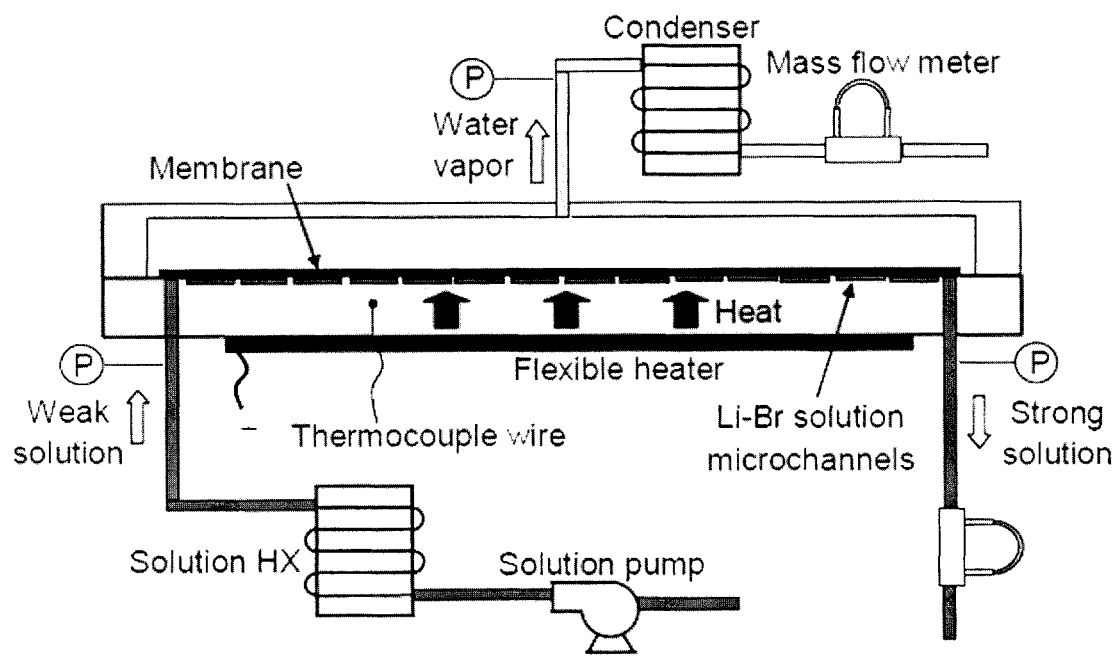
FIG. 15 shows a schematic diagram of an exemplary desorber that can employ a 3D-structured heat-exchanging surface, according to an embodiment of the invention.

A schematic of an exemplary desorber according to an embodiment of the invention is shown in FIG. 15. The overall size of the desorber is 16.8×16.5 cm². The ridges of the 3D-structured surface were machined on a corrosion-resistant C-22 Hastelloy over a 5.7×8.9 cm² area. A hydrophobic nanofibrous membrane was placed on the solution microchannels and secured in place by a perforated stainless steel sheet. This arrangement forms 200±10 μm deep solution channels, which was verified by comparison of the solution pressure drop with that predicted by laminar flow theory. Twelve thermocouples were installed within three trenches machined on the backside of the Hastelloy plate to measure wall temperatures. The remaining space within the trenches was filled with a high temperature conductive epoxy. A flexible thin-film heater (Omega Engineering, CT) was assembled over the entire surface to define the heat-exchange surface.

A micro gear pump (HNP Mikrosysteme, Germany) was attached to the desorber to drive the dilute LiBr solution through a heat exchanger, where the solution is preheated to a desired temperature before entering the desorber. The desorbed water vapor flows to a condenser, and the concentrated LiBr solution leaves the desorber and enters a Coriolis mass flow meter (Bronkhorst USA), where the LiBr solution flow rate and concentration are evaluated. The condensed water from the condenser flows through a Coriolis mass flow meter (Micro Motion, Inc.), where the desorption rate is directly measured. Three pressure transducers with a range of 0-100 kPα were installed to monitor desorber pressure conditions. Two of the transducers measure the LiBr solution flow pressure at the desorber inlet and outlet. The average solution pressure (Ps) was calculated from the readings of these transducers. The third transducer measured the vapor pressure (Pv) at the desorber vapor exit. All tests were conducted at a solution flow rate of 2.5 kg/hr and a solution inlet temperature of 60° C.

Figure 16:
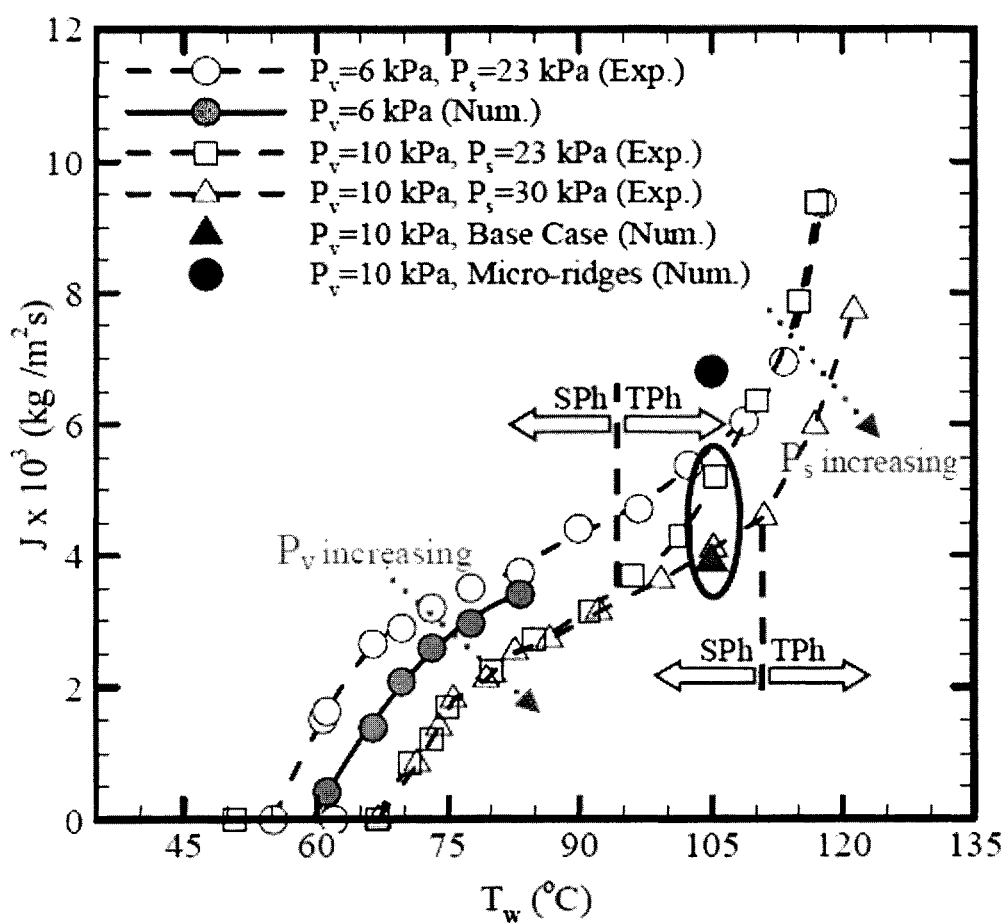
FIG. 16 shows plots of desorption rates versus heat-exchanger, labeled wall temperature, at different vapor and solution pressures, where SPh and TPh stand for single-phase and two-phase desorption modes, respectively and the dash lines mark where a significant change in the rate of increase in desorption occurs that indicates a shift from SPh to TPh desorption mode in base case desorbers and desorbers, according to an embodiment of the invention.

The numerical domain is a rectangular microchannel with a porous hydrophobic top wall and a heated bottom surface, and was treated in the manner for the absorber, above, to model the heat and mass transport within the solution. As with the absorber, the desorption process in microchannels without any surface features, a base case, was experimentally and numerically studied. FIG. 16 shows the experimental desorption rates as a function of heat-exchanging surface temperature, Tw, which is the average reading of the twelve thermocouples imbedded within the heated wall.

Figure 17:
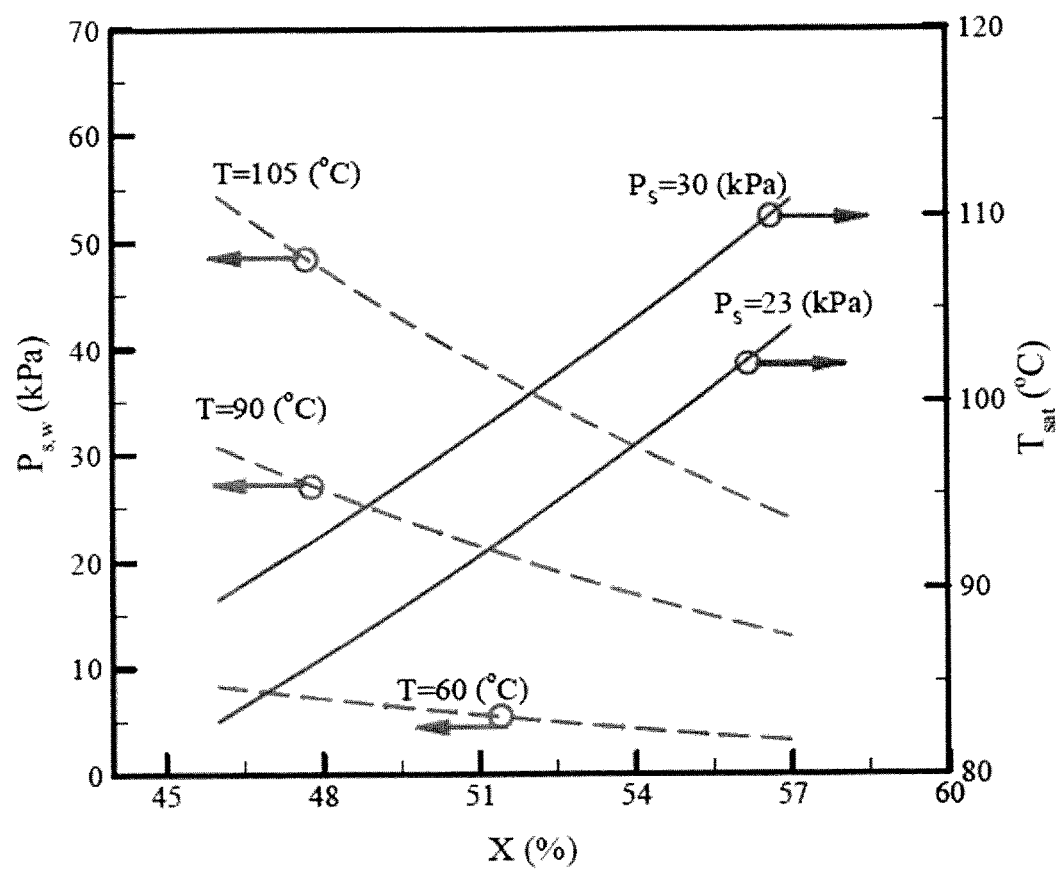
FIG. 17 shows plots of calculated solution water vapor pressure, $P_{s,w}$, as a function of temperature and LiBr concentration and the solution saturation temperature, $T_{sat}$, as a function of solution pressure and concentration.

A test was conducted using a vapor pressure, $P_v$, of 6 kPα, as the vapor pressure in a typical single-effect absorption refrigerant system (ARS) is between 5 to 10 kPα, depending on the condenser temperature, a solution pressure, $P_s$, of 23 kPα, and a solution concentration of 48%. Solution pressure was selected to be sufficiently higher than the vapor pressure such that both modes of desorption could be realized. The first non-zero desorption rate was measured at a surface temperature of approximately 60° C. Desorption at this temperature results from a positive driving pressure between the solution water vapor pressure, $P_{s,w}$, and the external vapor pressure, for example, $P_{s,w}-P_v>0$. Thermodynamic properties of the LiBr solution at the desorber inlet concentration confirmed that the solution water vapor pressure exceeded 6 kPα at a solution temperature of 60° C., as indicated in FIG. 17. The desorption rate steadily increases with the heat-exchanging surface temperature, or wall temperature, at a moderate pace, since increasing the solution temperature increases the solution water vapor pressure, and, consequently, increases the driving pressure potential. The desorption rate diminishes when the vapor pressure increases to 10 kPα, due to the decrease in pressure potential.

FIG. 16 provides a comparison of the numerical and experimental results. The numerical results, filled symbols, closely follow the experimental data, unfilled symbols. The small difference between the two is presumably due to uncertainty in the film thickness, inaccuracy in the solution water vapor pressure correlations used in the numerical code, and non-uniformity of the wall temperature. To probe the cause of the observed decline in the rates of increase of desorption at moderate heat-exchanging surface temperatures, as shown in FIG. 16, a set of numerical simulations was conducted. The results suggested that a small variation in the solution concentration entering the desorber is responsible for the observed behavior. Although efforts were made during the tests to maintain a constant inlet concentration, the system stabilized at a slightly different concentration for each test, which resulted in a gradual increase in the solution inlet concentration from 48% to 51% within a heat-exchanging surface temperature range of 60° C. to 83° C.

Figure 18:
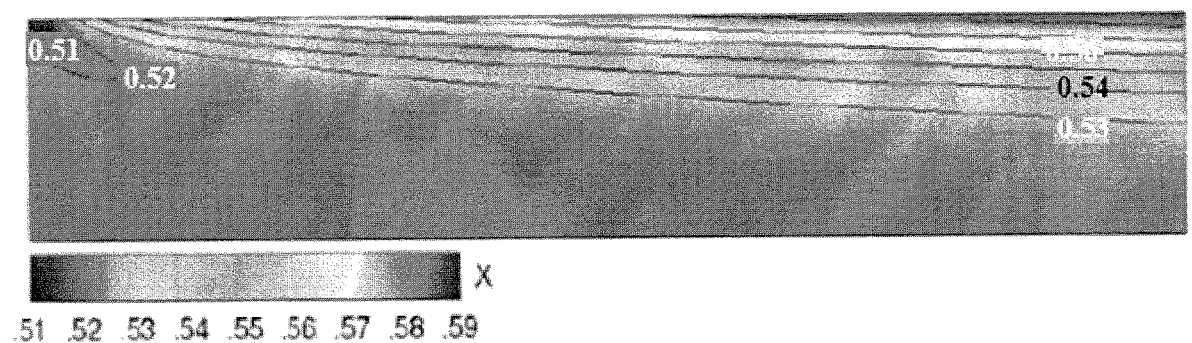
FIG. 18 shows a map of LiBr solution concentration contours within a 200 µm thick and 89 mm long channel in a base case desorber.

At a solution pressure of 23 kPα, when the heat exchange surface temperature was increased a few degrees above the solution saturation temperature, about 93° C. at the average solution concentration of 52%, as indicted in FIG. 17, the desorption rate rose significantly, as indicated in FIG. 16, which signifies a change in the desorption regime. This change is associated with fluctuations in the desorption rate, solution flow rate, and pressure readings due to instabilities associated with boiling the solution flow. In a subsequent test, the solution pressure was increased to 30 kPα to suppress boiling by increasing the solution saturation temperature (to about 103° C. at an average concentration of 53%, as indicated in FIG. 17, while other test conditions were maintained. The results shown in FIG. 16 display a lower desorption rate when boiling is suppressed. FIG. 18 provides a numerical depiction of the LiBr concentration distribution at the solution pressure of 30 kPα with an inlet concentration of 52%. This FIG. highlights that a significant portion of the solution does not participate in the desorption process due to the slow water molecules' diffusion rate. A comparison of the numerical base case and the experimental desorption rates are also provided in FIG. 16.

Figure 19A:
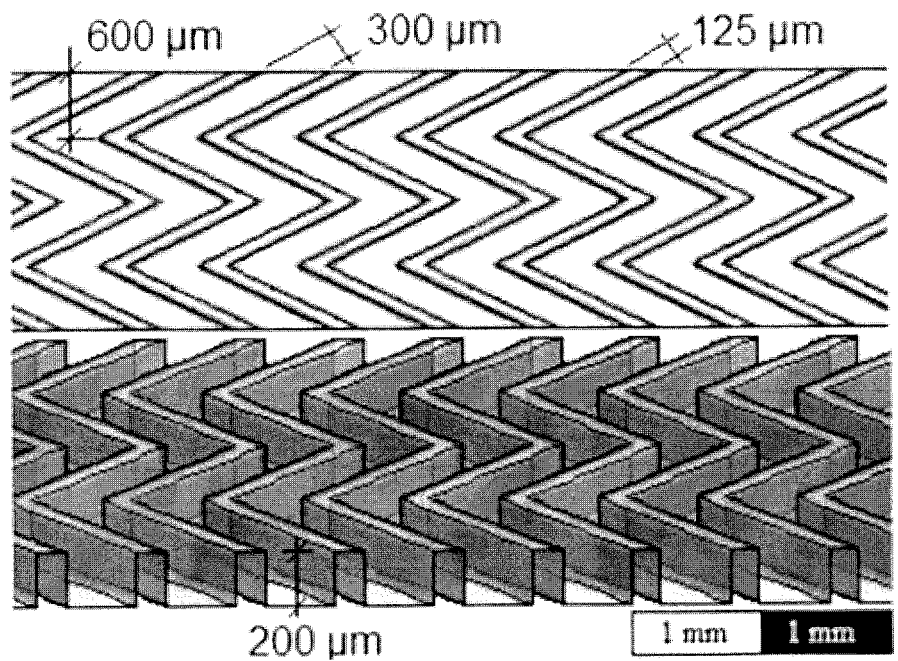
FIG. 19A shows a staggered herringbone 3D-structured heat-exchanging surface with micro-ridges for a desorber, according to an embodiment of the invention.
Figure 19B:
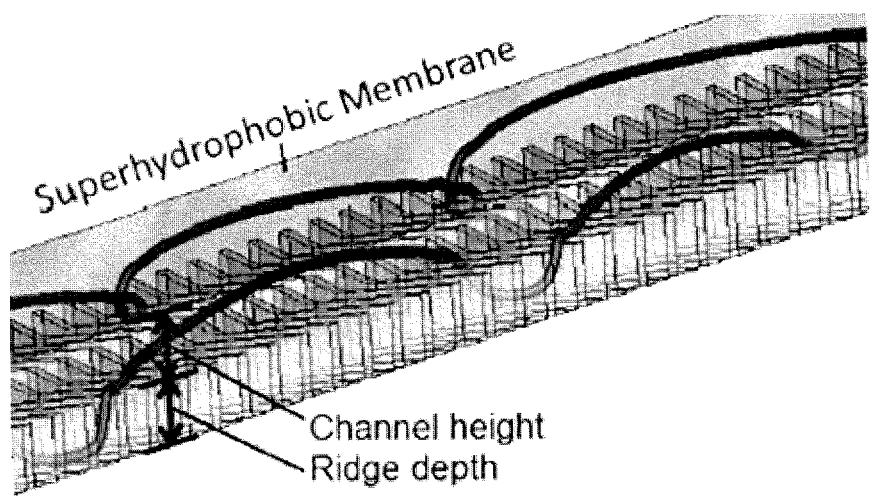
FIG. 19B shows two fluid vortex pathlines during a simulated solution flow.

To continuously force water-rich solution to the vapor-exchanging surface in contact with the membrane, the 3D-structured ridges were constructed on the heat-exchanging surface on the bottom wall of the flow channel, as illustrated in FIG. 19A. As with the absorber, it was determined by numerical simulation that the most important design factor for the desorber's 3D-structured surface is the ridge depth to channel height ratio. The results presented here are for a depth to height ratio of one. FIG. 19A provides details of the design implemented in the numerical simulation. In FIG. 19B, two pathlines in the solution microfilm are traced to illustrate the generation of transverse currents within the flow stream.

Figure 20A:
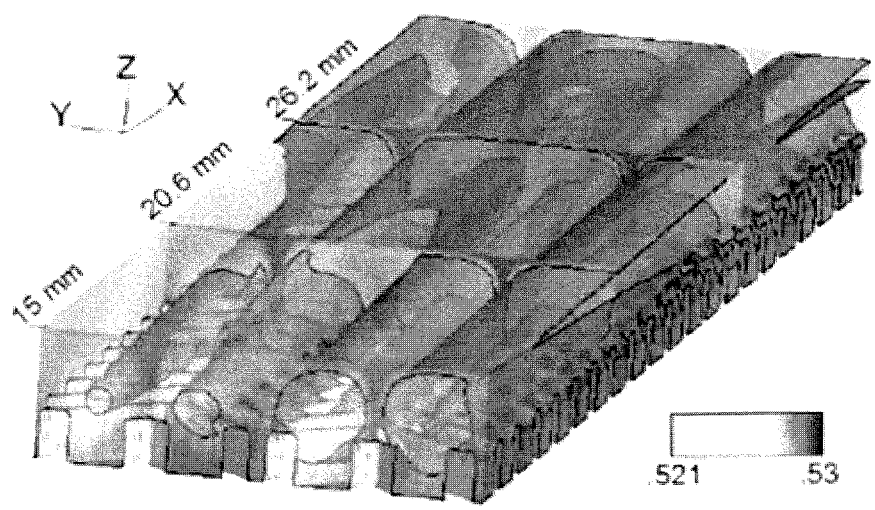
FIG. 20A shows a 3D view of LiBr concentration contours for a channel of a desorber according to an embodiment of the invention.
Figure 20B:
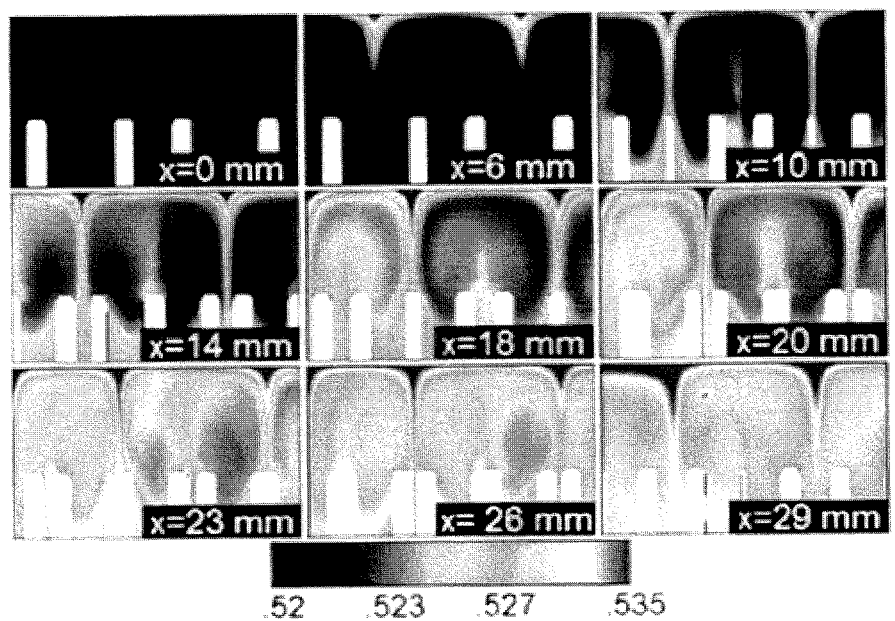
FIG. 20B shows LiBr concentration cross-sections at various lengths between an inlet, x=0, and 29 mm along a channel of the desorber.

FIG. 20A shows a 3D view of the concentration contours depicting the impact of vortices on the concentration field. The numerical simulation was conducted at a solution pressure of 30 kPα, a vapor pressure of 10 kPα, an inlet concentration of 52%, and a heat-exchanging surface wall temperature of 103° C. The replenishment of the concentrated solution at the membrane-solution interface with the water-rich solution is indicated by the concentration contours at different cross sections, as shown in FIG. 20B. The cross sections are chosen between x=0 mm and x=29 mm. At x=0 mm, the bulk solution concentration is 52%. As the solution flows along the microchannel, the vortices force the concentrated solution at the vapor-exchange surface near the membrane downward, as indicated at x=6 to 14 mm. That volume of concentrated solution is replaced with the water-rich dilute solution that rises from the heat-exchanging surface at the bottom of the flow channel, as indicated at x=18 to 29 mm. The bulk concentration reached approximately 53.5% at x=29 mm.

Figure 21:
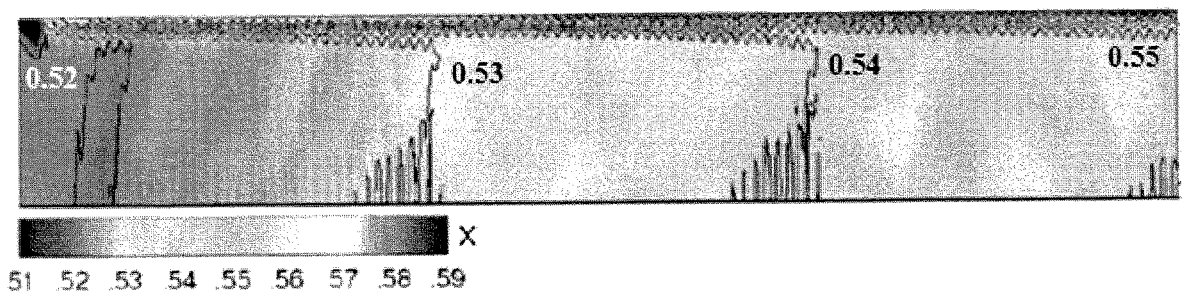
FIG. 21 shows a map of LiBr solution concentration contours within a 200 µm thick and 89 mm long channel having 3D-structured micro-ridges on the heat-exchanging surface at the flow channel bottom, according to an embodiment of the invention.

The concentration contours at y=1.32 mm cross-section are shown in FIG. 21. When compared to the base case of FIG. 18, the introduction of ridges on the heat-exchange surface substantially modifies the concentration distribution. The transverse currents due to the 3D-structures on the heat-exchanging surface continuously interrupt the boundary layer growth, which results in a uniform concentration distribution at each cross-section. Although the mass transfer mechanism within the bulk flow has changed from diffusion to convection, the desorption process at the membrane-solution interface remains diffusion limited.

Figure 22:
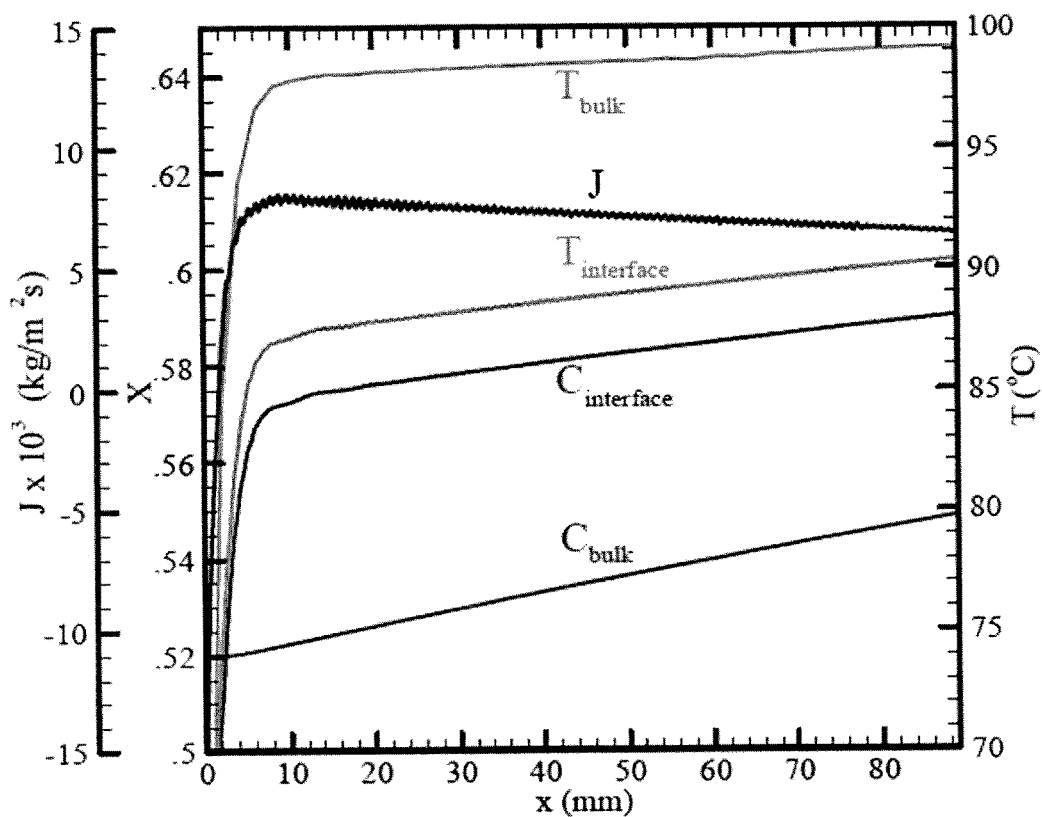
FIG. 22 shows plots of the desorption rate (J) of a desorber according to an embodiment of the invention, and the concentration (C) and temperature (T) in the bulk solution and at the vapor-exchanging surface, labeled interface, along the length of the flow channel.

Variations of important parameters in the solution flow are plotted in FIG. 22. At the desorber inlet, since the solution water vapor pressure is significantly lower than the external vapor pressure, vapor is absorbed into the solution, giving a negative desorption rate. This phenomenon results in a significant reduction in the interface concentration. However, the high heat transfer coefficient associated with the microchannel flow results in rapid heating of the solution shortly after it enters the desorber such that the solution water vapor pressure exceeds the external vapor pressure, for example, of 10 kPα, and the desorption process begins. As the water vapor desorbs from the solution, the interface and the bulk solution concentrations increase along the flow direction. The desorption rate gradually declines as the overall concentration of the solution increases along the flow channel. The average desorption rate from the solution in this case is approximately 0.0068 kg/m2 s, which is about 1.7 times greater than that of the base case and is about 1.3 times higher than that of boiling at the same surface temperature.

Figure 3B:
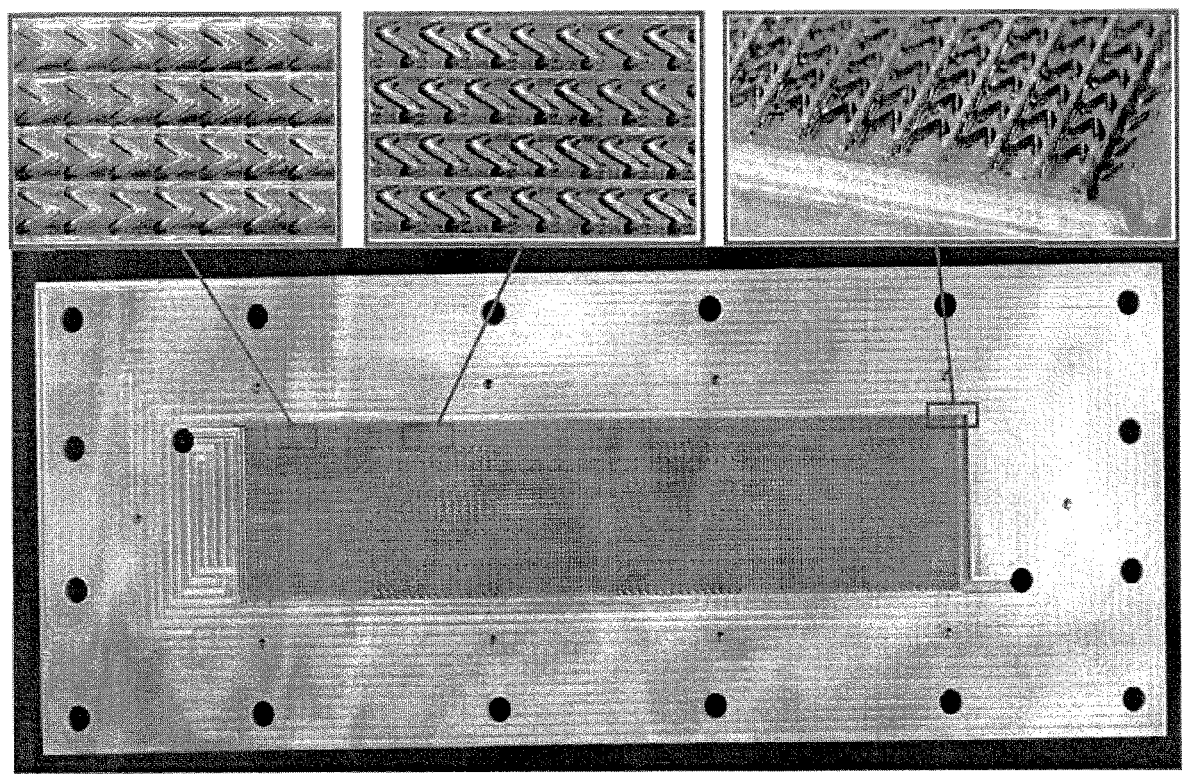
FIG. 3B shows photographs of an absorber with magnified photos displaying wall structures, according to an embodiment of the invention.
Figure 3C:
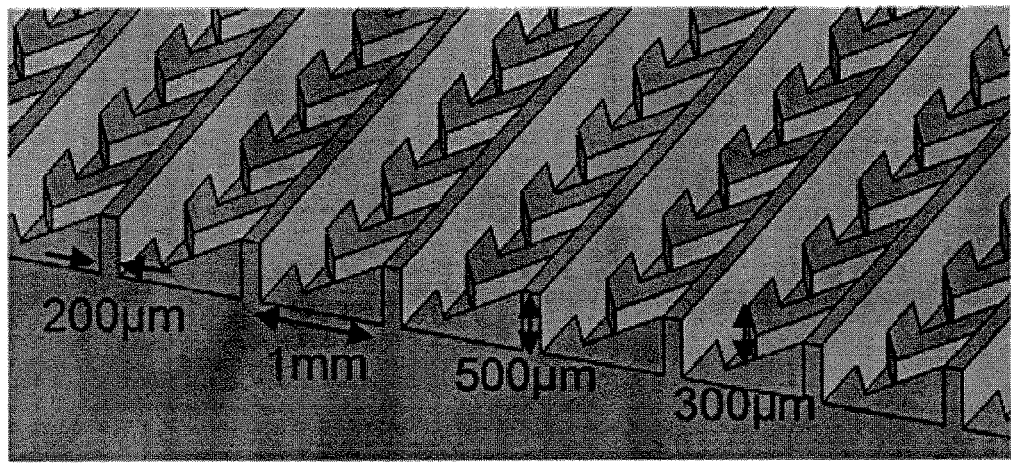
FIG. 3C shows a 3D drawing and top view showing the wall structures dimensions and features across channels, according to an embodiment of the invention.
Figure 3C:
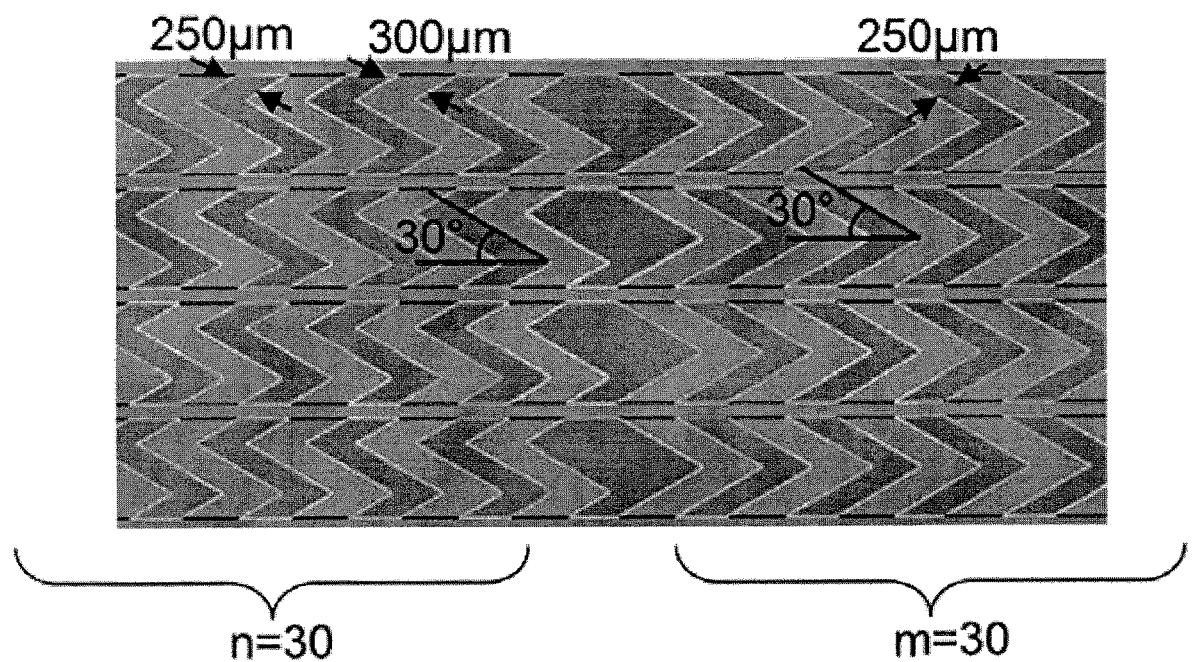

In another exemplary embodiment of the invention, an absorber heat exchanger, as shown in FIG. 3B, was used; where FIG. 3C shows 3D drawings of the wall structure dimensions. The overall dimensions of the absorber are 311×117 mm² with an active area of 195×38 mm². Solution microchannels and ridges were machined within the active area. Solution is constrained within the microchannels by three solid walls (a bottom and two side walls) and a hydrophobic nanofibrous membrane on the top. The membrane used in this test has a nominal pore size of 1 mm and is 80% porous. A perforated SS (stainless steel) plate with a pore size of 1.2 mm, a thickness of 0.5 mm, and an open area of 63% supports and secures the membrane on the microchannels. The solution microchannels are 500-mm deep, 1-mm wide and 195-mm long. The water vapor generated in the evaporator flows through the membrane and subsequently absorbs in the strong LiBr solution. To cool the solution, microchannels were machined on the backside of the brass plate (not shown). The height and width of the water channels are 0.4 mm and 4 mm, respectively. The cooling water from a chiller was pumped through the microchannels.

At the microchannels floor, the ridges were machined as per the dimensions indicated in FIG. 3C. The dimensions were determined through the optimization process discussed above; where the ridges direction (or pattern) is changed after a certain number of ridges (i.e., 30 in this case) because alternating between the two wall patterns continuously brings concentrated solution from the middle of vortices to the vapor-liquid interface.

Figure 2B:
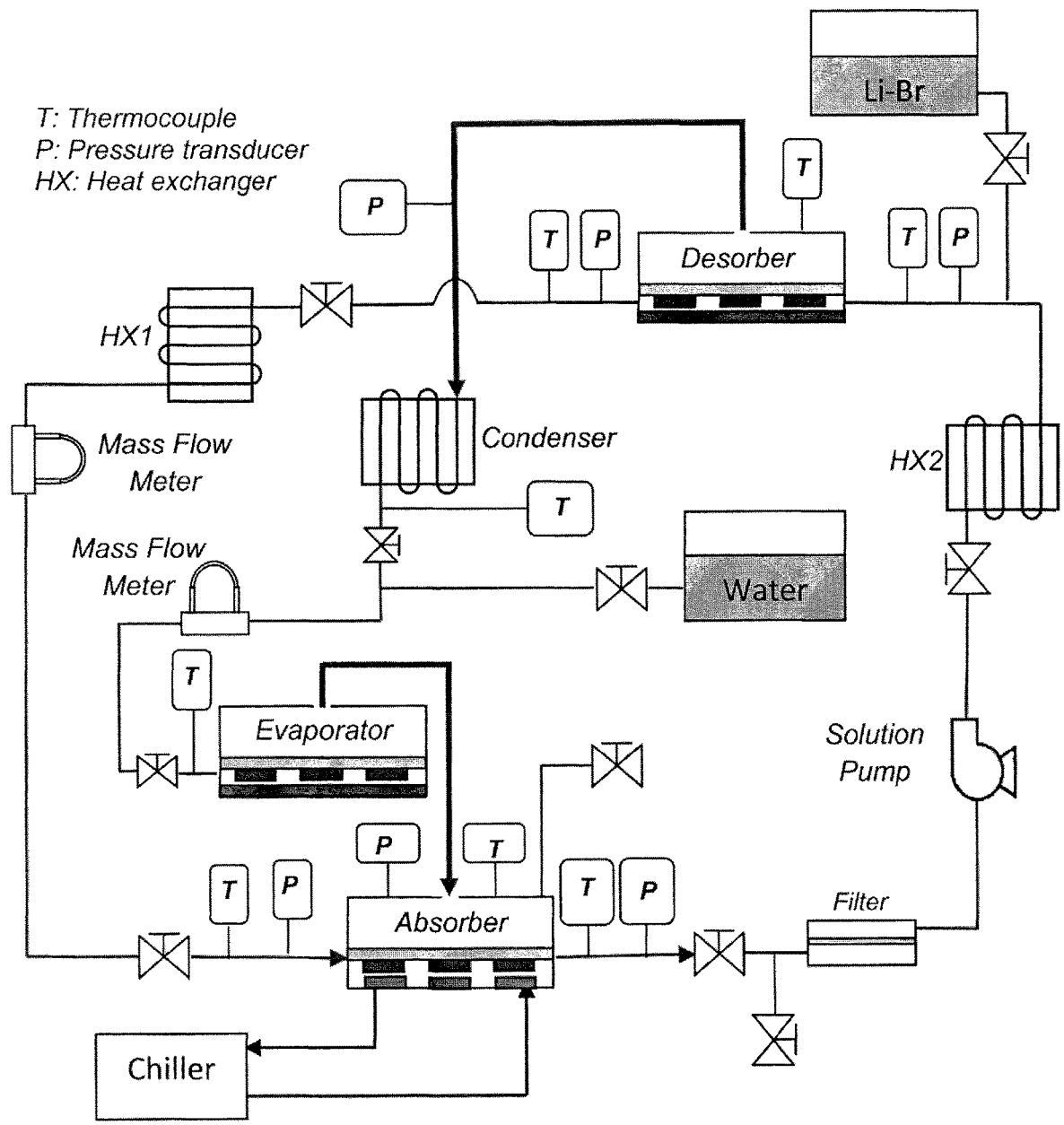
FIG. 2B shows a schematic diagram of the assembled ARS-like system employed in an experimental setup using an absorber, according to an embodiment of the invention.

The studies are performed on a model. FIG. 2B shows a schematic of the exemplary loop of the exemplary membrane-based ARS; which consists of a LiBr solution line and a refrigerant (water) line. The solution line includes an absorber, desorber, pump, filter, solution reservoir, Coriolis mass flow meter, and two solution heat exchangers. The water line includes an evaporator, condenser, Coriolis mass flow meter, and a water reservoir. In the solution line, a micro gear pump (HNP Mikrosysteme, Germany) drives the weak LiBr solution to a Coriolis mass flow meter (Bronkhorst USA) and then through a solution heat exchanger where the solution is preheated to a desired temperature before entering the desorber. In the desorber, the weak LiBr solution is heated by a thin film heater (Omega Engineering, CT) to desorb water. The desorbed water vapor flows to a condenser and the strong LiBr solution leaves the desorber and flows through a heat exchanger where it is cooled to a preset temperature before it enters the absorber. The condensed water leaves the condenser and flows through a Coriolis mass flow meter (Micro Motion, Inc.) to the evaporator where it is vaporized and supplied back to the absorber. The strong solution flows through the absorber and absorbs the water vapor generated in the evaporator. The weak solution leaving the absorber flows through a filter and is pumped back to the solution pre-heater and then the desorber to complete the cycle.

To control the inlet temperature of the absorber and desorber, the solution flows through the heat exchangers where it is cooled or heated using TEC (thermoelectric cooling/heating) units. A similar arrangement exists for the condenser heat exchanger. The desorber and evaporator heat exchangers are heated by flexible heaters. The loop includes two small reservoirs with sight glass to monitor liquid in the solution and water lines. These reservoirs act as compensation chambers to assist in charging of the loop. Three pressure transducers with a range of 0-10 kPα monitor absorber pressure conditions. Two of the transducers measure the LiBr solution flow pressure at the absorber inlet and outlet. The third transducer measures vapor pressure (Pv) at the absorber inlet. The data measured by pressure transducers, thermocouples, and mass flow meters were recorded by a data acquisition system. Setup, test procedure, and uncertainty analysis were performed as disclosed in Isfahani et al. *Int. J. Heat Mass Transf.* 2013, 63, 82-90. Effects of water vapor pressure, cooling water temperature, and solution inlet temperature were determined as summarized in Table 4.

TABLE 4

Input values for parameters

| Parameter | Nominal | Range |
|---|---|---|
| Solution flow rate ($m_{sol}$) | 2.5 kg/hr | |
| Cooling water inlet temperature ($T_{cw,in}$) | 25° C. | 25-35° C. |
| Solution inlet temperature ($T_{sol,in}$) | 25° C. | 31-43° C. |
| Water vapor pressure (Pv) | 1.10 kPa | 0.80-1.60 kPa |
| Inlet solution concentration ($X_{in}$) | 60 ± 1.5% | NA |

Table 1, above, gives values for the uncertainty in measurement of pressure, solution flow rate, and temperature for this exemplary setup. The accuracy of the water mass flow meter that directly measures the water absorption rate at the condenser exit is ±1%. Due to the unsteady nature of the condensate flow, a fluctuation of up to ±5% was recorded during the experiment. The reported absorption rates are the average of the measured values over a period of time, after the system reached a steady state.

Figure 23:
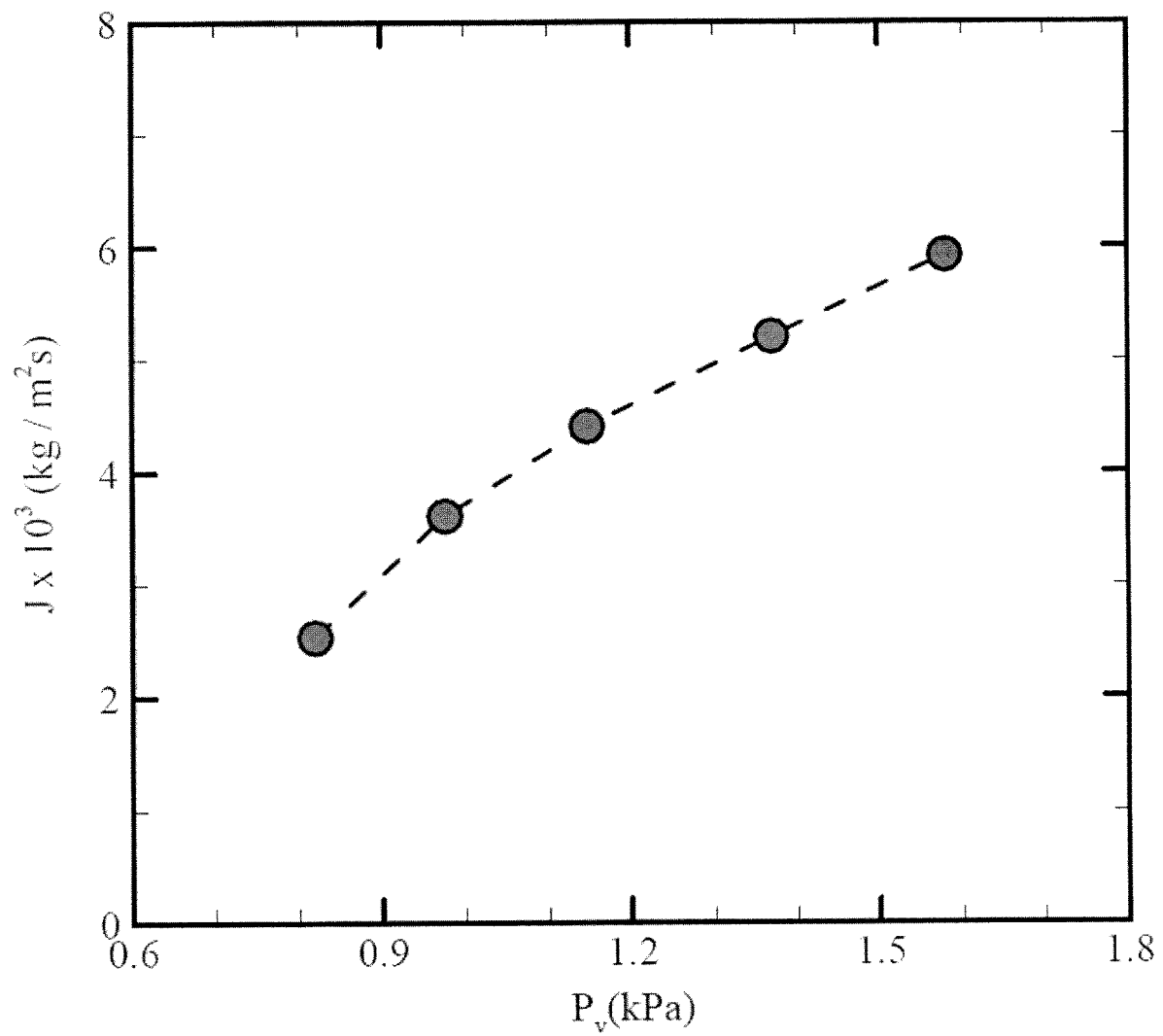
FIG. 23 shows a plot of absorption rate variations as a function of water vapor pressure for an absorber employing walled microchannels, according to an embodiment of the invention.
Figure 24:
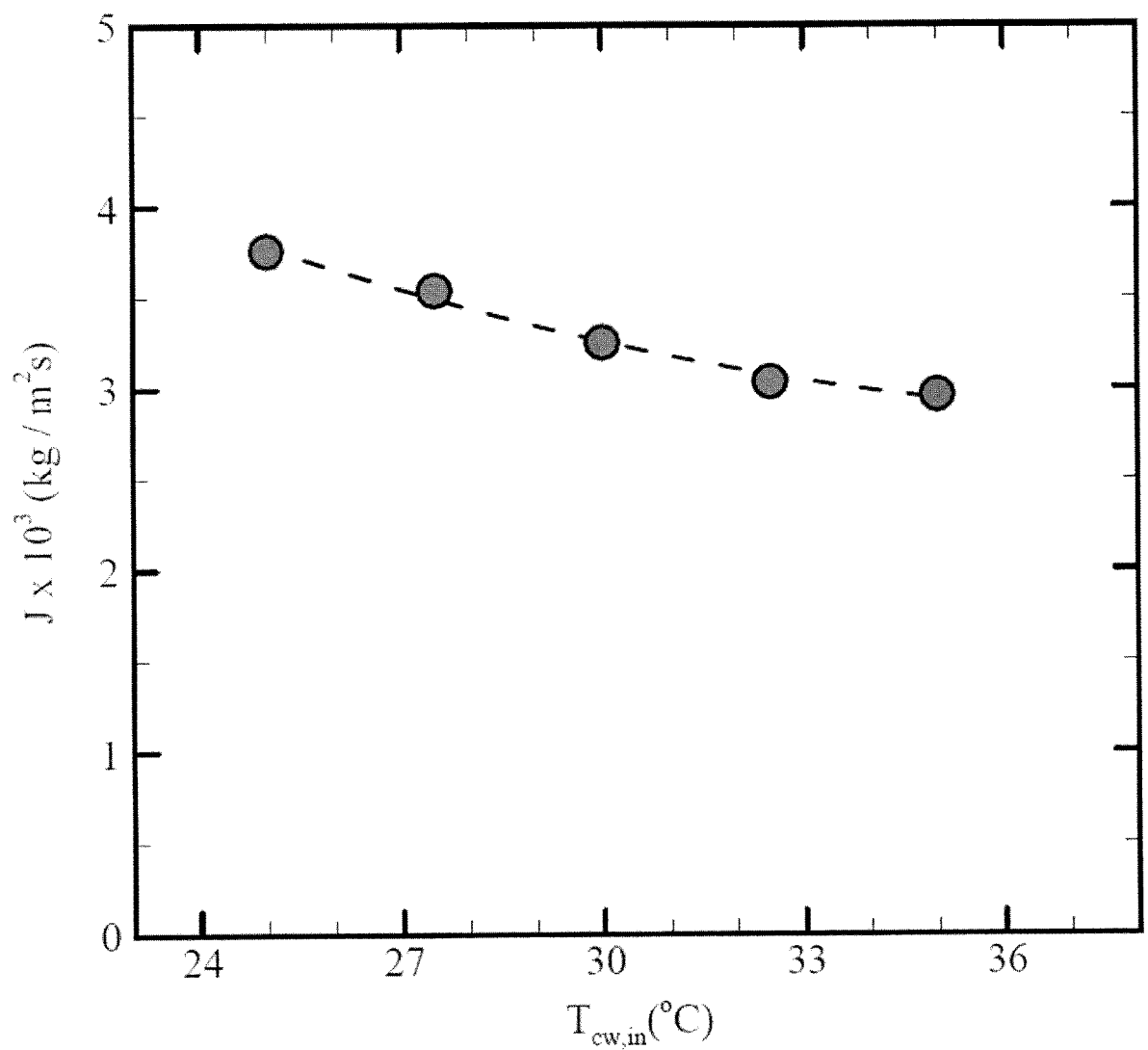
FIG. 24 shows a plot of absorption rate variations as a function of cooling water inlet temperature for an absorber employing walled microchannels, according to an embodiment of the invention.

In a first series of tests, the effect of water vapor pressure on the absorption rate was investigated. The water vapor pressure was varied by changing the evaporator temperature. The absorption rate was measured directly by the Coriolis mass flow meter installed in the refrigerant line. Increasing the water vapor pressure increases the pressure potential between the water vapor and the LiBr solution and consequently increases the mass driving potential for the absorption process. The water vapor pressure was increased from 800 to 1600 Pa while the other test conditions were kept at the nominal values given in Table 4. FIG. 23 shows increasing of the absorption rate with the vapor pressure. In the second series of tests, the cooling water temperature was changed from 25 to 35° C. while the other test conditions were kept constant at the nominal conditions listed in Table 4. Changing the cooling water temperature changes the solution temperature and consequently the solution water vapor pressure. This variation ultimately leads to a change in the pressure potential and absorption rate. As shown in FIG. 24, the absorption rate decreases linearly with the cooling water temperature.

Figure 25:
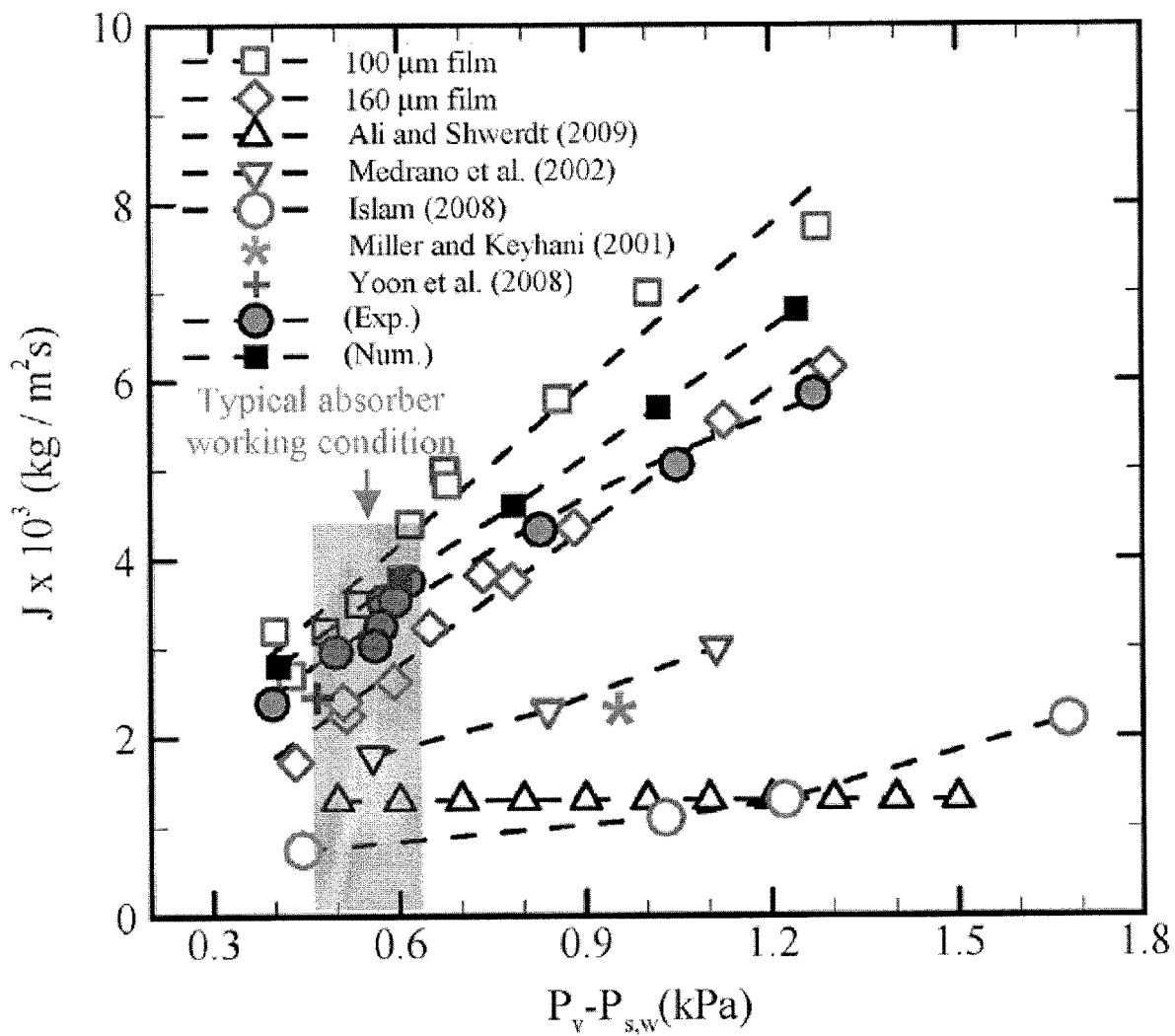
FIG. 25 shows plots of absorption rate variations as a function of water vapor pressure potential for an absorber employing walled microchannels, according to an embodiment of the invention, absorbers without the walls, according to an embodiment of the invention, and prior art designs.

As the driving force for the absorption process is the pressure potential between the vapor and the LiBr solution, any comparison of the absorption rates should be conducted at the same pressure potential. FIG. 25 shows the absorption rates presented in FIGS. 23 and 24 as a function of the corresponding pressure potential ($P_v-P_{s,w}$). The solution water vapor pressure used in the calculation is the average of the absorber inlet and exit solution pressures. FIG. 25 also shows results obtained in falling film absorption studies and the membrane based studies disclosed above. Literature data was collected at different operating conditions (i.e., solution inlet temperature and concentration, vapor pressure, and solution flow rate); however, since the data is plotted against the pressure potential, the differences in temperature, concentration, and vapor pressure conditions are filtered out.

To calculate the pressure potential for the test results plotted in FIG. 25 for Medrano et al., Miller and Keyhani, and Yoon et al., the solution exit temperature was assumed (since it was not reported) to be equal to the cooling water exit temperature. These results clearly suggest that the absorption rate of the 500-micron-thick solution film with herringbone ridges is as high as the absorption rate of a 100-micron-thick solution film at the operating conditions of an actual absorber (i.e. $P_v-P_{s,w}=0{:}5{\sim}0{:}6$ kPα corresponding to an evaporator temperature of about 5° C. and a solution average concentration of 57%). The high absorption rate achieved stems from the mixing effect of vortices generated in the flow field. The presence of ridges along with direction alteration sets up a churning motion in the bulk fluid that continuously brings concentrated solution from the bottom of the flow channel to the membrane-solution interface and carries away the weak (i.e., water-rich) solution from the absorption zone to be subsequently mixed with the bulk flow.

Figure 26:
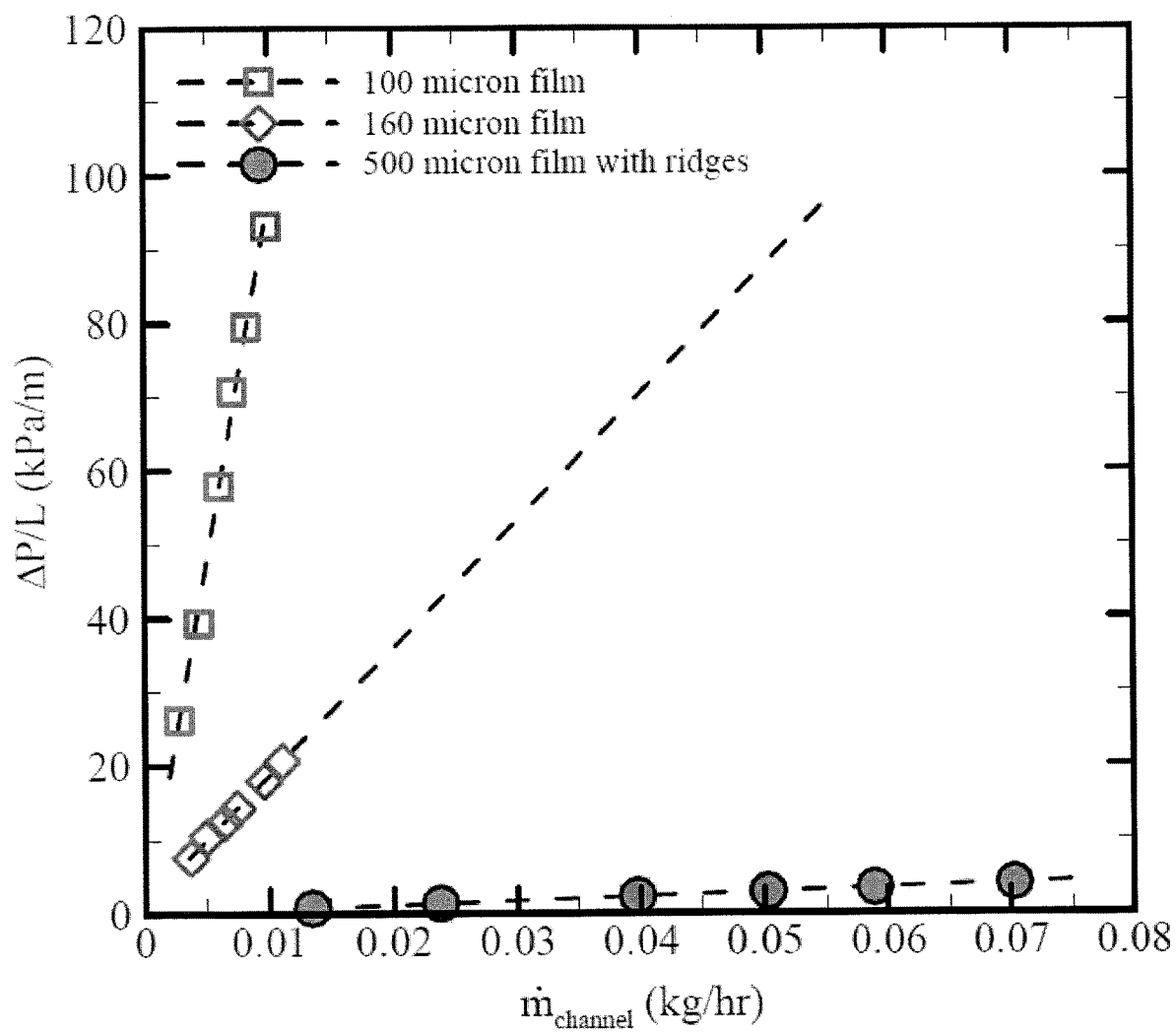
FIG. 26 shows plots of solution pressure drop as a function of flow rate for an absorber employing walled microchannels, according to an embodiment of the invention, absorbers without the walls, according to an embodiment of the invention.
Figure 27:
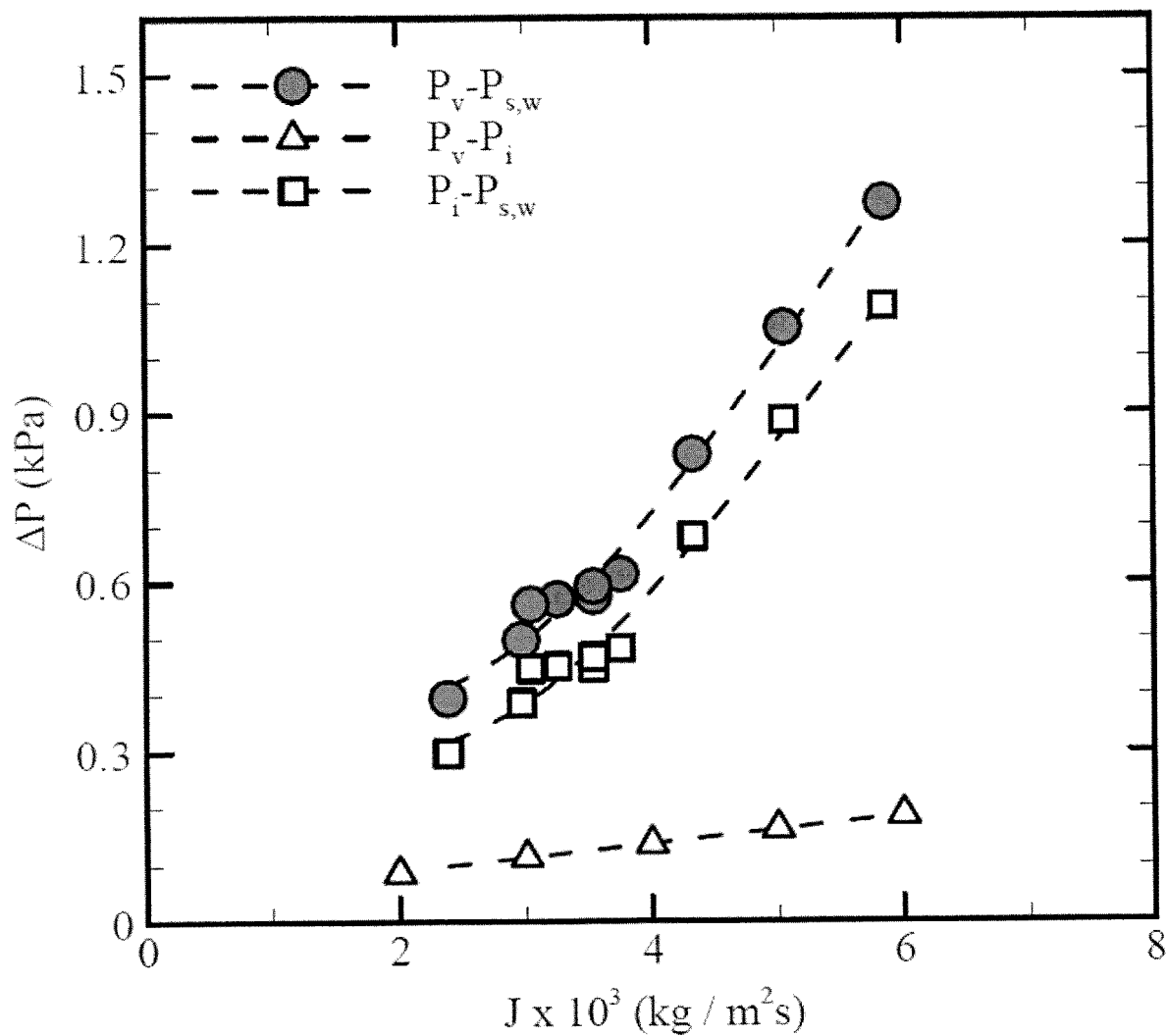
FIG. 27 shows plots of membrane and solution resistance for an absorber employing walled microchannels, according to an embodiment of the invention.

The absorption rates for these walled microchannels can be as high as that of a 100-micron-thick solution film achieved above in their absence using typical operating conditions of an absorber. The practical significance of this result becomes more apparent through a comparison of the solution pressure drop in both cases. FIG. 26 shows the pressure drop of the 500-micron-thick solution film with micro-mixing and that of a 100-micron-thick solution film, above. The results suggest a reduction of about two orders of magnitude in the pressure drop in the new approach. This observation is consistent with the laminar flow theory, as discussed earlier. To further characterize our absorber, the significance of the membrane resistance and its contribution to the overall mass transfer resistance is investigated and the results are provided in FIG. 27. The membrane pressure drop is separately measured using a test setup discussed in Isfahani et al. Int. J. Refrig. 2013, 36, 2297-307. FIG. 27 compares the membrane pressure drop, $P_v$–Pi (Pi is pressure at the membrane-solution interface), with the overall pressure potential ($P_v - P_{s,w}$).

Figure 28:
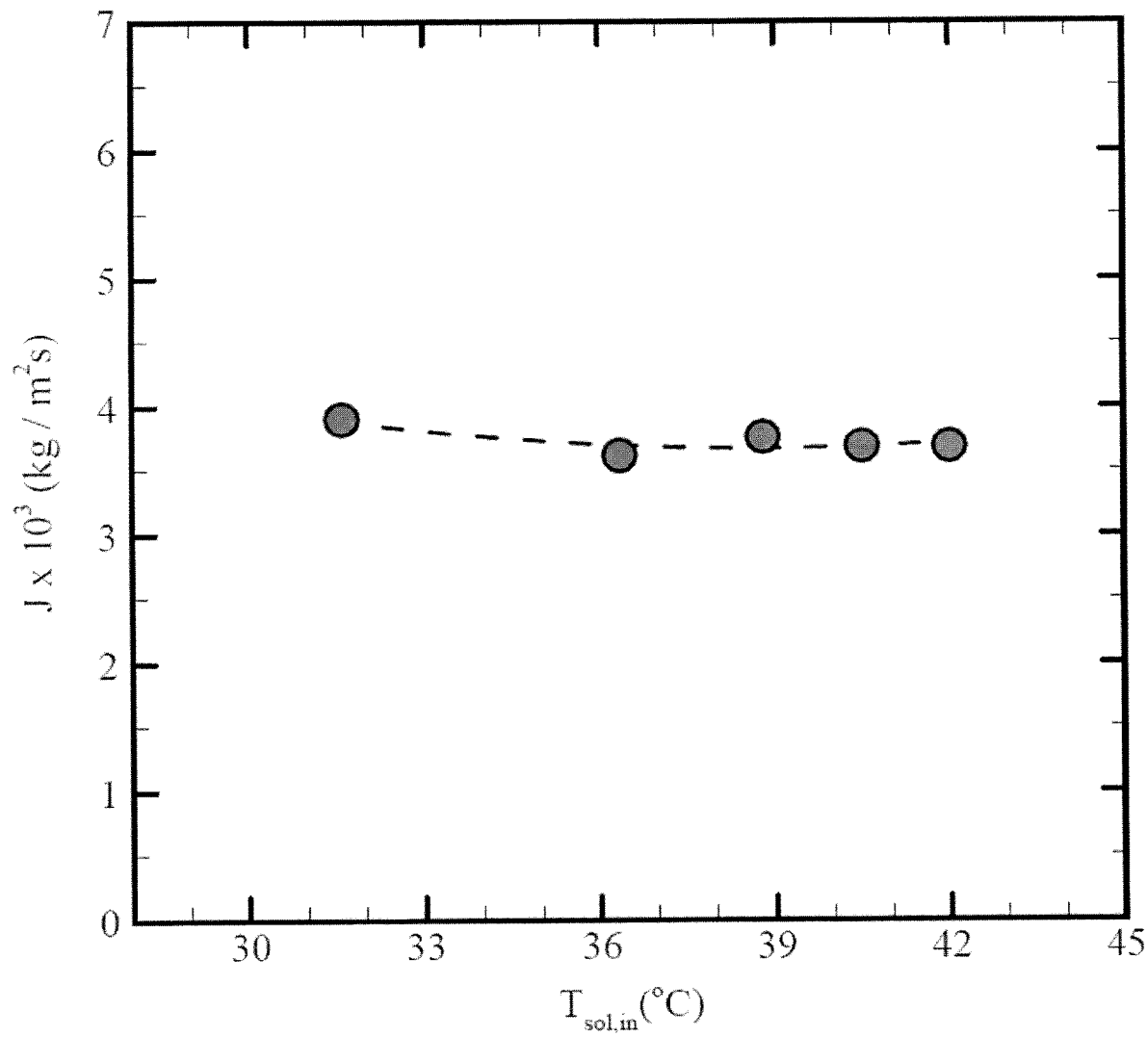
FIG. 28 shows a plot of absorption rate variations as a function of solution inlet temperature for an absorber employing walled microchannels, according to an embodiment of the invention.

The comparison suggests that the membrane mass transfer resistance is not dominant (only 10-15% of the total pressure drop) in this arrangement. Rather, the dominant resistance is mass transfer through the solution ($P_i$–Ps,w). Results presented in FIG. 28 indicate that the absorption rate slightly declines as the solution inlet temperature is increased; where this decline in absorption rate is due to an increase in the solution water pressure that results in reduction of the pressure potential driving the absorption process. However, the high heat transfer coefficient associated with the microchannel flow results in rapid cooling of the solution flow shortly after it enters the absorber channels. Hence, the absorption process is found to be less sensitive to the solution inlet temperature with this membrane absorber design, when compared to other parametric variations without the walls.

All patents, patent applications, provisional applications, and publications referred to or cited herein are incorporated by reference in their entirety, including all FIG.s and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. An absorber or desorber, comprising:
   a plurality of micro-channels, wherein (1) each of the plurality of micro-channels comprises at least one 3-D structured heat-exchanging surface consisting of a series of ridges projected up from a base of the corresponding micro-channel between sidewalls of the corresponding micro-channel, the series of ridges forming an alternatingly asymmetrical herringbone structure, (2) a ratio between a depth of the ridges and a channel height of each of the plurality of micro-channels is larger than or equal to 0.6, and (3) the sidewalls of each of the plurality of micro-channels are thermally conductive;
   a hydrophobic membrane situated proximal to a vapor-exchanging surface, wherein the vapor-exchanging surface is distal to the at least one 3-D structured heat-exchanging surface, wherein the at least one 3-D structured heat-exchanging surface resides on each of the plurality of micro-channels; and
   a solution, wherein the solution residing within the micro-channel has vortices that mix temperatures and concentrations by flowing over the at least one 3-D structured heat-exchanging surface of the absorber or desorber.

2. The absorber or desorber according to claim 1, wherein the membrane comprises nanofibers and the solution is an absorbing solution.

3. The absorber or desorber according to claim 2, wherein the absorbing solution is a LiBr solution.

4. The absorber or desorber according to claim 1, wherein the herringbone structure comprises a series of left arms connected at an angle to respective right arms.

5. The absorber or desorber according to claim 4, wherein each of the ridges have a short arm and a long arm, and wherein a first portion of the series of ridges that have the short arms oriented to one side of the micro-channel alternates with a second portion of the series of ridges having the short arms oriented to a second side opposite the first side.

6. The absorber or desorber according to claim 4, where the ridges consist of solid walls.

7. The absorber or desorber according to claim 4, wherein the alternating asymmetry of the herringbone structure is formed by a first portion of the series of left arms being long than the respective right arms, followed by a portion of the respective series of right arms being longer than corresponding left arms.

8. An absorption system, comprising at least one of the absorber and the desorber according to claim 1.

9. A method of absorbing vapors, comprising:
   providing the absorber according to claim 1;
   flowing a solution comprising a absorbent through the micro-channels of the absorber;
   cooling the 3-D structured heat-exchanging surface; and
   exposing vapors of the solvent to the vapor-exchanging surface of the solution through the membrane.

10. The method of claim 9, wherein the herringbone structure comprises a series of left arms connected at an angle to respective right arms.

11. The method of claim 10, wherein the alternating asymmetry of the herringbone structure is formed by a first portion of the series of left arms being long than the respective right arms, followed by a portion of the respective series of right arms being longer than corresponding left arms.

12. A method of desorbing vapors, comprising:
   providing the desorber according to claim 1;
   flowing a solution comprising absorbent through the micro-channels of the desorber;
   heating the 3-D structured heat-exchanging surface; and
   expelling vapors of the absorbent from the vapor-exchanging surface of the solution through the membrane.

13. The method of claim 12, wherein the herringbone structure comprises a series of left arms connected at an angle to respective right arms.

14. The method of claim 13, wherein the alternating asymmetry of the herringbone structure is formed by a first portion of the series of left arms being long than the respective right arms, followed by a portion of the respective series of right arms being longer than corresponding left arms.

15. An absorption system, comprising at least one of the absorber or the desorber according to claim 1.

16. The absorption system of claim 15, wherein the herringbone structure comprises a series of left arms connected at an angle to respective right arms.

17. The absorption system of claim 16, wherein the alternating asymmetry of the herringbone structure is formed by a first portion of the series of left arms being long than the respective right arms, followed by a portion of the respective series of right arms being longer than corresponding left arms.

* * * * *